US011567833B2

(12) United States Patent
Luse et al.

(10) Patent No.: US 11,567,833 B2
(45) Date of Patent: Jan. 31, 2023

(54) METHODS AND APPARATUS TO ASSIGN INDICES AND RELOCATE OBJECT FRAGMENTS IN DISTRIBUTED STORAGE SYSTEMS

(71) Applicant: Intel Corporation, Santa Clara, CA (US)

(72) Inventors: Paul E. Luse, Chandler, AZ (US); John Dickinson, San Francisco, CA (US); Samuel Merritt, Hayward, CA (US); Clay Gerrard, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/449,925

(22) Filed: Oct. 4, 2021

(65) Prior Publication Data
US 2022/0206896 A1   Jun. 30, 2022

Related U.S. Application Data

(63) Continuation of application No. 16/831,291, filed on Mar. 26, 2020, now Pat. No. 11,182,248, which is a
(Continued)

(51) Int. Cl.
*G06F 11/30*   (2006.01)
*G06F 11/10*   (2006.01)
*G06F 3/06*    (2006.01)

(52) U.S. Cl.
CPC .......... *G06F 11/1076* (2013.01); *G06F 3/064* (2013.01); *G06F 3/067* (2013.01); *G06F 3/0617* (2013.01); *G06F 3/0619* (2013.01)

(58) Field of Classification Search
None
See application file for complete search history.

(56) References Cited

U.S. PATENT DOCUMENTS 7,734,643 B1    6/2010  Waterhouse et al.
8,396,920 B1 *  3/2013  Pupius ............... G06F 16/9566
                                                    709/217
(Continued)

FOREIGN PATENT DOCUMENTS

AU    2015213285    3/2016
CN    101636712     1/2010
(Continued)

OTHER PUBLICATIONS

Ford et al., "Availability in Globally Distributed Storage Systems," 9th USENIX Symposium on Operating Systems Design and Implementation, 2010, retrieved from <research.google.com/pubs/archive/36737.pd>, 14 pages.
(Continued)

*Primary Examiner* — Mujtaba M Chaudry
(74) *Attorney, Agent, or Firm* — Hanley, Flight & Zimmerman, LLC

(57) ABSTRACT

Methods and apparatus to dynamically assign and relocate object fragments in distributed storage systems are disclosed. In some examples, an apparatus to compile fragments of an object includes a fragment compiler to: compile an object from fragments stored in storage nodes, respective ones of the fragments corresponding to (a) a node index of storage identifiers representative of the storage nodes and (b) a fragment index of fragment identifiers associated with the respective ones of the fragments of the object, respective ones of the fragment identifiers being representative of a sequential order of the fragments of the object, the respective ones of the fragment identifiers to be associated with the respective ones of the storage identifiers to enable verification of storage locations of the respective ones of the fragments of the object relative to respective storage nodes; request a first one of the fragments from a first one of the respective storage nodes; determine if a first fragment index
(Continued)

assigned to the first one of the fragments matches a first node index assigned to the first one of the fragments; when the first fragment index matches the first node index, compile the first one of the fragments into the object based on the first node index; and when the first fragment index does not match the first node index, compile the first one of the fragments into the object based on the first fragment index.

20 Claims, 11 Drawing Sheets

Related U.S. Application Data continuation of application No. 15/080,843, filed on Mar. 25, 2016, now Pat. No. 10,621,041.

(56) References Cited

U.S. PATENT DOCUMENTS

| | | | | |
|---|---|---|---|---|
| 8,532,171 | B1* | 9/2013 | Narayanan | H04N 21/21805 375/240.01 |
| 8,723,703 | B2 | 5/2014 | Oh et al. | |
| 8,959,067 | B1 | 2/2015 | Patiejunas et al. | |
| 10,621,041 | B2 | 4/2020 | Luse et al. | |
| 11,182,248 | B2 | 11/2021 | Luse et al. | |
| 2002/0076048 | A1* | 6/2002 | Hars | G11B 20/00086 713/176 |
| 2005/0131906 | A1 | 6/2005 | Shin | |
| 2008/0109697 | A1 | 5/2008 | Ho et al. | |
| 2009/0094433 | A1* | 4/2009 | Thomas | G06F 12/0246 711/170 |
| 2011/0099594 | A1* | 4/2011 | Chen | H04N 21/4516 725/105 |
| 2013/0159890 | A1* | 6/2013 | Rossi | G06F 9/451 715/762 |
| 2014/0046909 | A1 | 2/2014 | Patiejunas et al. | |
| 2014/0212038 | A1* | 7/2014 | Dejean | G06V 30/414 382/229 |
| 2015/0052354 | A1 | 2/2015 | Purohit | |
| 2015/0222704 | A1 | 8/2015 | Kipp et al. | |
| 2016/0011935 | A1 | 1/2016 | Luby | |
| 2016/0011936 | A1 | 1/2016 | Luby | |
| 2016/0011939 | A1 | 1/2016 | Luby | |
| 2016/0134341 | A1 | 5/2016 | Agee et al. | |
| 2017/0060683 | A1 | 3/2017 | Luby et al. | |
| 2017/0083416 | A1 | 3/2017 | Richardson et al. | |
| 2017/0228285 | A1 | 8/2017 | Merritt et al. | |
| 2017/0277590 | A1 | 9/2017 | Luse et al. | |
| 2020/0327011 | A1 | 10/2020 | Luse et al. | |

FOREIGN PATENT DOCUMENTS

| | | |
|---|---|---|
| CN | 103547992 | 1/2014 |
| CN | 105260136 | 1/2016 |

OTHER PUBLICATIONS

Evans, "Big Data Storage: Hadoop Storage Basics," Computer Weekly, retrieved from <http://www.computerweekly.com/feature/Big-data-storage-Hadoop_stora . . . >, retrieved on Mar. 7, 2016, 5 pages.

Chun et al., "Efficient Replica Maintenance for Distributed Storage Systems," Proceedings of the 3rd Conference on Networked Systems Design & Implementation, vol. 3, 2006, retrieved from <https://www.usenix.org/event/nsdi06/tech/full_papers/chun/chun.pdf>, 14 pages.

"Erasure Code Support," Openstack, retrieved from <http://docs.openstack.org/developer/swift/overview_erasure_code.html>, retrieved on Mar. 9, 2016, 8 pages.

Tian et al., "Probabilistic Failure Detection for Efficient Distributed Storage Maintenance," Proceedings of the 2008 Symposium on Reliable Distributed Systems, 2008, retrieved from <https://www.cs.ucsb.edu/.../protector-srds08.pd . . . >, 10 pages.

"Swift Architectural Overview," Openstack, retrieved from <http://docs.openstack.org/developer/swift/overview_architecture.html>, retrieved on Mar. 9, 2016, 3 pages.

"What is Erasure Coding—Definition from WhatIs.com," Techtarget, Nov. 2014, retrieved from <http://searchstorage.techtarget.com/definition/erasure-coding>, retrieved on Feb. 12, 2016, 4 pages.

European Patent Office, "Extended European Search Report," issued in connection with European Patent Application No. 17770769.2, dated Nov. 18, 2019, 7 pages.

European Patent Office, "Communication pursuant to Rules 70(2) and 70a(2) EPC," issued in connection with European Patent Application No. 17770769.2, dated Dec. 5, 2019, 1 page.

International Searching Authority, "International Search Report," issued in connection with International Patent Application No. PCT/US2017/017881, dated May 25, 2017, 3 pages.

International Searching Authority, "Written Opinion," issued in connection with International Patent Application No. PCT/US2017/017881, dated May 25, 2017, 7 pages.

International Bureau, "International Preliminary Report on Patentabilty," issued in connection with International Patent Application No. PCT/US2017/017881, dated Oct. 4, 2018, 9 pages.

European Patent Office, "Communication pursuant to Article 94(3) EPC," issued in connection with European Patent Application No. 17770769.2, dated Feb. 16, 2021, 6 pages.

United States Patent and Trademark Office, "Non-Final Office Action," issued in connection with U.S. Appl. No. 15/080,843, dated Apr. 10, 2019, 7 pages.

United States Patent and Trademark Office, "Final Office Action," issued in connection with U.S. Appl. No. 15/080,843, dated Jul. 29, 2019, 6 pages.

United States Patent and Trademark Office, "Advisory Action", issued in connection with U.S. Appl. No. 15/080,843 dated Oct. 9, 2019, 3 pages.

United States Patent and Trademark Office, "Notice of Allowance and Fee(s) Due," issued in connection with U.S. Appl. No. 15/080,843, dated Dec. 9, 2019, 9 pages.

China National Intellectual Property Administration, "Office Action", issued in connection with Chinese Patent Application No. 201780016447.X dated Jun. 24, 2021, 9 pages. (English Translation Included).

United States Patent and Trademark Office, "Non-Final Office Action", issued in connection with U.S. Appl. No. 16/831,291 dated Mar. 8, 2021, 7 pages.

United States Patent and Trademark Office, "Notice of Allowance and Fee(s) Due", issued in connection with U.S. Appl. No. 16/831,291 dated Jul. 2, 2021, 7 pages.

\* cited by examiner

METHODS AND APPARATUS TO ASSIGN INDICES AND RELOCATE OBJECT FRAGMENTS IN DISTRIBUTED STORAGE SYSTEMS

CROSS REFERENCE TO RELATED APPLICATION

This patent arises from a continuation of U.S. patent application Ser. No. 16/831,291, filed Mar. 26, 2020, and titled "Methods and Apparatus to Assign Indices and Relocate Object Fragments in Distributed Storage Systems, which is a continuation of U.S. patent application Ser. No. 15/080,843, filed on Mar. 25, 2016, and titled "Methods and Apparatus to Assign Indices and Relocate Object Fragments in Distributed Storage Systems. U.S. patent application Ser. No. 16/831,291 and U.S. patent application Ser. No. 15/080,843 are hereby incorporated herein by reference in their entireties. Priority to U.S. patent application Ser. No. 16/831,291 and U.S. patent application Ser. No. 15/080,843 is hereby claimed.

FIELD OF THE DISCLOSURE

This disclosure relates generally to data management, and, more particularly, to methods and apparatus to assign indices and relocate object fragments in distributed storage systems.

BACKGROUND

In recent years, object-based storage, or distributed storage systems, have been implemented as alternates to file hierarchy or data block storage. Such distributed storage systems often provide redundancy and application specific policies. In some instances, Erasure Coding, or Error correction coding, is used in connection with object-based storage to break objects into fragments and distribute the fragments according to other storage policies.

DETAILED DESCRIPTION

Figure 1:
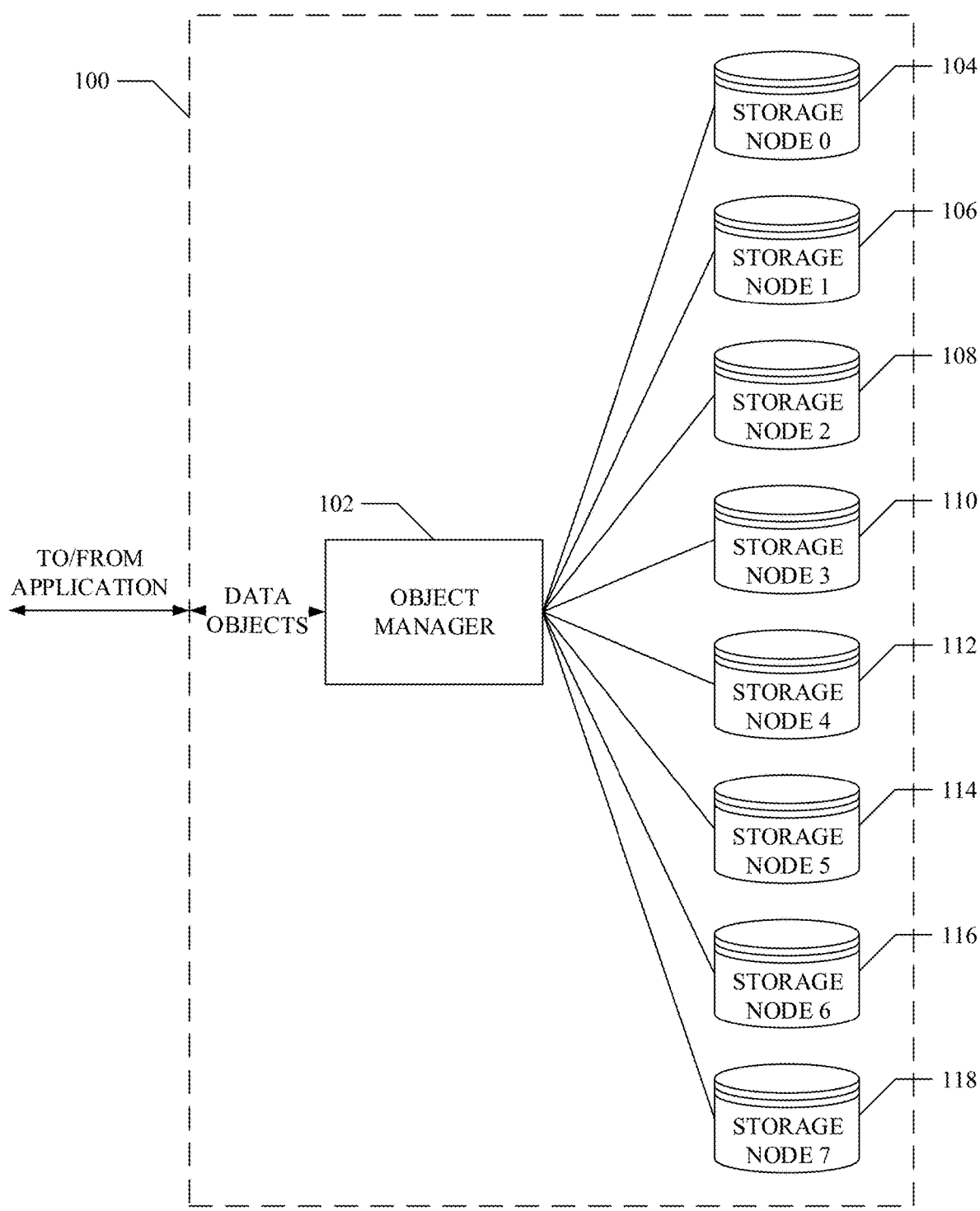
FIG. 1 is a block diagram illustrating an example object manager in an example distributed storage system.

Distributed storage systems are implemented to distribute data (e.g., in the form of objects) and/or distribute the processing of data across any number of computing devices that may or may not be located in the same physical location (e.g., dispersed over a network of connected computers, such as, for example, the Internet). In some examples, distributed storage systems cluster multiple computing devices as storage devices or storage nodes.

In some examples, a cluster is a set of connected computing devices (e.g., nodes) that work together such that they are viewed as a single system. In some such examples, each computing device, or storage node, is used as a server. In some examples, a storage node is a physical machine having local storage (e.g., hard-disk drives, solid-state drives, etc.). In some examples, a storage node is a virtual machine with access to one or more storage drives. In some examples, the storage nodes are physically clustered in a single location. In some examples, the storage nodes are spread out across a network (e.g., the Internet) and digitally clustered (e.g., different servers from different locations are digitally designated as a single cluster). In some examples, the cluster of storage nodes is part of an Internet of Things network. In some examples, the nodes that make up the cluster are in communication with an object manager (e.g., a proxy server). Often, objects are distributed by the object manager to a plurality of storage nodes in one or more clusters.

Distributed storage systems attempt to provide (1) consistency, (2) availability, and (3) partition tolerance based on the structure of the distributed storage system.

As used herein, consistency is defined to be a property in which a requested object will be the same across numerous sources (e.g., object 1 stored in a first location should match object 1 stored in a second location). In some examples, consistency takes priority over partition tolerance and/or availability by design. These distributed storage systems are often called strongly consistent systems. In strongly consistent systems, an object is not acknowledged as complete (e.g., is not available) until it is consistent in all locations. In some examples, partition tolerance and/or availability take priority over consistency by design. Such example distributed storage systems are often called "eventually consistent" systems. In eventually consistent examples, locations (e.g., nodes) communicate to ensure each location has consistent information (e.g., during initial storage, upgrades, downgrades, etc.).

As used herein, availability is defined to be a property in which the stored object will be accessible even if consistency cannot be achieved. As used herein, partition tolerance is defined to be a property in which the system will continue to operate despite arbitrary partitioning due to network failures (e.g., system will work if communication between nodes is severed).

Availability and partition tolerance are provided through a combination of durability policies, structure design, and services that perform one or more tasks, such as, for example, balancing data across a cluster (e.g., redistributing data proportionate to capacity of storage devices within the cluster). For example, if there are 8 objects stored across 7 nodes (e.g., one node has two objects) and an $8^{th}$ node is added to the cluster, the 8 objects may be redistributed such that there is a single object in each node. Thus, if a node that originally stored two objects (e.g., but only stores one after redistribution) fails, only a single object is unavailable instead of two objects.

In some examples, the durability of data is important in view of the consistency, availability, and partition tolerance properties. As used herein, durability is defined to be a property in which an object will continue to exist once the object has been committed to the distributed storage system.

Thus, any tasks performed to achieve, maintain, and/or overlook consistency, availability, and/or partition tolerance should not cause an object to become lost, corrupted, or otherwise non-existent.

In some examples, to avoid any object becoming unrecoverable/unavailable (e.g., increasing data durability and/or availability), the object manager encodes objects with error correction coding, or Erasure coding, to break the objects into one or more fragments that the object manager stores across various storage nodes. By encoding objects with error correction coding, the object manager can reconstruct objects when one or more fragments (e.g., bits, bytes, etc.) of the object are lost, corrupted, or otherwise incorrect during error correction decoding. For example, error correction coding determines p parity fragments based on an object having m data fragments using one or more error correction equations (e.g., Reed-Solomon coding). In such examples, the object manager creates a code word of m+p fragments. In other words, the example object manager encodes an object with error correction coding to form a code word. As used herein, a code word is defined to be the combination of the original data fragments of an object and parity fragments determined from the original data fragments based on the error correction code used to encode the object.

In some examples, encoding an object with error correction coding by calculating p parity fragments from m data fragments allows the object manager to correct up top errors (e.g., incorrect data, data degradation, missing data, etc.) during decoding. In some examples, as long as any m fragments (e.g., data and/or parity) from a code word are available, the original code word can be reconstructed and the object encoded with error correction coding can be recovered. For example, a common Reed Solomon coding technique can correct up to 4 errors for a code word having 10 data fragments and 4 parity fragments (e.g., having a length of 14 fragments). The number of errors correctable by error correction coding differs amongst various error correction coding techniques. In some examples, any number of error correction coding techniques with varying numbers of parity fragments to correct various numbers of errors can be used without departing from the scope of the present disclosure.

An object may have errors for numerous reasons. For example, an object may be subject to noise, data corruption, hardware failures, execution of an incorrect instructions, etc. Error correction coding provides a capability to recover an object by creating data fragments and parities.

However, distributed storage systems may change topology due to failures (e.g., a server and/or network outage) and/or administrative reconfigurations (e.g., the addition or removal of servers), potentially relocating the fragments (and parity) created by error correction coding. Thus, object fragments and parities are also susceptible to becoming lost (e.g., as are objects themselves when error correction coding is not applied) due to a server or network outage, topology changes, or reconfigurations, in addition to being susceptible to errors from noise, data corruption, hardware failures, execution of an incorrect instruction, etc. If more than p fragments are erred or are lost, then the object cannot be recovered, even with error correction coding.

The aforementioned structures of a distributed storage system create difficulty in the tracking of where objects and/or fragments thereof are located in the distributed storage system. It is often difficult to track which storage nodes store which fragments after system failures, storage node handoffs, and/or topology reconfigurations.

FIG. 1 is a block diagram illustrating an example distributed storage system 100 including an example object manager 102 to store fragments of objects therein. In the illustrated example of FIG. 1, the example distributed storage system 100 includes a first topology having the example object manager 102 communicatively connected to example storage node 0 104, example storage node 1 106, example storage node 2 108, example storage node 3 110, example storage node 4 112, example storage node 5 114, example storage node 6 116, and example storage node 7 118.

The example object manager 102 is responsible for managing the example distributed storage system 100. For example, the example object manager 102 receives requests from applications for the storage and/or retrieval of objects from the example distributed storage system 100. The example object manager 102 identifies the locations where objects are to be stored and/or where objects are currently stored. The example object manager 102 routes the requests from the applications according to such locations (e.g., nodes).

As described above, an object may be fragmented based on one or more error correction codes. In such examples, the object manager 102 encodes objects based on an error correction code to create fragments of the object. Similarly, the example object manager 102 decodes retrieved fragments to recreate the objects. The example object manager 102 accesses an example error correction coding library, for example, to implement different error correction codes when requested by an application.

For example, an object may be defined as O. In such examples, the object O, may be encoded with error correction coding and broken into eight fragments, six corresponding to data fragments A, B, C, D, E, F, (e.g., extracted from O) and two corresponding to parity fragments Y, Z (e.g., calculated from A, B, C, D, E, F). Thus, an example code word based on the example object O may be A, B, C, D, E, F, Y, Z where the last two parity fragments Y, Z are calculated from the data fragments A, B, C, D, E, F. Of course, different error correction codes may produce different numbers of parity fragments and/or parity fragments with differing values.

As disclosed herein, objects and fragments thereof may be any size (e.g., bit-sized, byte-sized, megabyte-sized, etc.). Thus, in some examples, an object may be 60 megabytes and the fragments A, B, C, D, E, F, Y, Z may be 10 megabytes each (e.g., totaling an 80 megabyte code word). In some examples, an object may be 6 bits and the fragments A, B, C, D, E, F, Y, Z may be 1 bit each (e.g., totaling an 8 bit or 1 byte code word). Of course, objects and fragments thereof may have differing sizes (e.g., a first fragment is 10 megabytes while a second fragment is 20 megabytes).

In some examples, the object manager 102 distributes fragments of objects to the storage nodes 104, 106, 108, 110, 112, 114, 116, 118 for storage thereof. In the illustrated example, the object manager 102 stores the fragments of the object in the storage nodes 104, 106, 108, 110, 112, 114, 116, 118 in sequential order. In other words, the example object manager 102 stores a first fragment in the storage node 104 (e.g., storage node 0), a second fragment in the storage node 106 (e.g., storage node 1), etc.

For example, for the example code word A, B, C, D, E, F, Y, Z, the object manager 102 stores the first fragment "A" in the storage node 104, the object manager 102 stores the second fragment "B" in the storage node 106, the object manager 102 stores the third fragment "C" in the storage node 108, the object manager 102 stores the fourth fragment "D" in the storage node 110, the object manager 102 stores the fifth fragment "E" in the storage node 112, the object manager 102 stores the sixth fragment "F" in the storage node 114, the object manager 102 stores the seventh fragment "Y" in the storage node 116, and the object manager 102 stores the eighth fragment "Z" in the storage node 118.

In some examples, the storage nodes 104, 106, 108, 110, 112, 114, 116, 118 contain only the fragments of the code word (e.g., object and parity fragments). Alternatively, the example storage nodes 104, 106, 108, 110, 112, 114, 116, 118 may be separated into buckets, bins, or other storage containers, such that each storage node 104, 106, 108, 110, 112, 114, 116, 118 contains different types and sizes of data along with the fragments of the code word (e.g., multiple fragments from different code words, multiple fragments from the same code word, other objects, etc.).

In some examples, the object manager 102 retrieves the fragments of code word from the storage nodes 104, 106, 108, 110, 112, 114, 116, 118 in response to a request from an application. The example object manager 102 sends requests to the example storage nodes 104, 106, 108, 110, 112, 114, 116, 118 for the respective fragments of the code word stored therein. The example storage nodes 104, 106, 108, 110, 112, 114, 116, 118 send the respective fragments of the code word to the example object manager 102 for compilation of the same.

In some examples, the example object manager 102 compiles the fragments of the code word based on the order of the example storage nodes 104, 106, 108, 110, 112, 114, 116, 118. In other words, the example object manager 102 requests a first fragment (e.g., the first fragment "A") from a first storage node 104 (e.g., storage node 0), a second fragment (e.g., the second fragment "B") from a second storage node 106 (e.g., storage node 1), etc. In some examples, the object manager 102 concatenates, or otherwise arranges, the fragments accordingly to achieve the proper order. In some examples, the object manager 102 decodes the fragments of the code word independent of the order in which the fragments are stored. The error correction code used to encode the object may determine whether the order of the fragments is required.

For example, the example object manager 102 compiles the example code word A, B, C, D, E, F, Y, Z, from the fragments stored within the example storage nodes 104, 106, 108, 110, 112, 114, 116, 118. The example object manager 102 then recovers the object O by removing the previously calculated parity fragments X, Y from the data fragments A, B, C, D, E, F. As disclosed herein, the number of fragments (e.g., data and/or parity) required to recover object O varies based on various error correction schemes, and not all fragments (data or parity) are required to recover the object O.

However, distributed storage systems frequently add nodes to clusters, remove nodes from clusters, and balance data across a cluster (e.g., redistribute data proportionate to capacity of storage devices within the cluster) to provide increased data availability, especially in response to a network outage, server failure, etc. In some examples, rearranging the locations of the fragments makes it difficult to locate where a fragment is located.

In the examples where p or less fragments are missing, corrupted, in a different node, or otherwise unavailable, the example object manager 102 can recreate the example code word based on the error correction coding (e.g., correction for up to t errors in a code word). In some examples, if more than p fragments are missing and/or the order of the available fragments change due to the example distributed storage system redistributing data, then the example object manager 102 will fail to reproduce the example code word and the example distributed storage system 100 fails to recover the object associated with that code word. For example, in some error correction schemes, even if all the example fragments A, B, C, D, E, F, Y, Z, are available, but they are rearranged such that more than p fragments are not where they were originally (e.g., F, E, D, C, B, A, Y, Z), the error correction coding may fail to recreate the code word A, B, C, D, E, F, Y, Z.

Figure 2A:
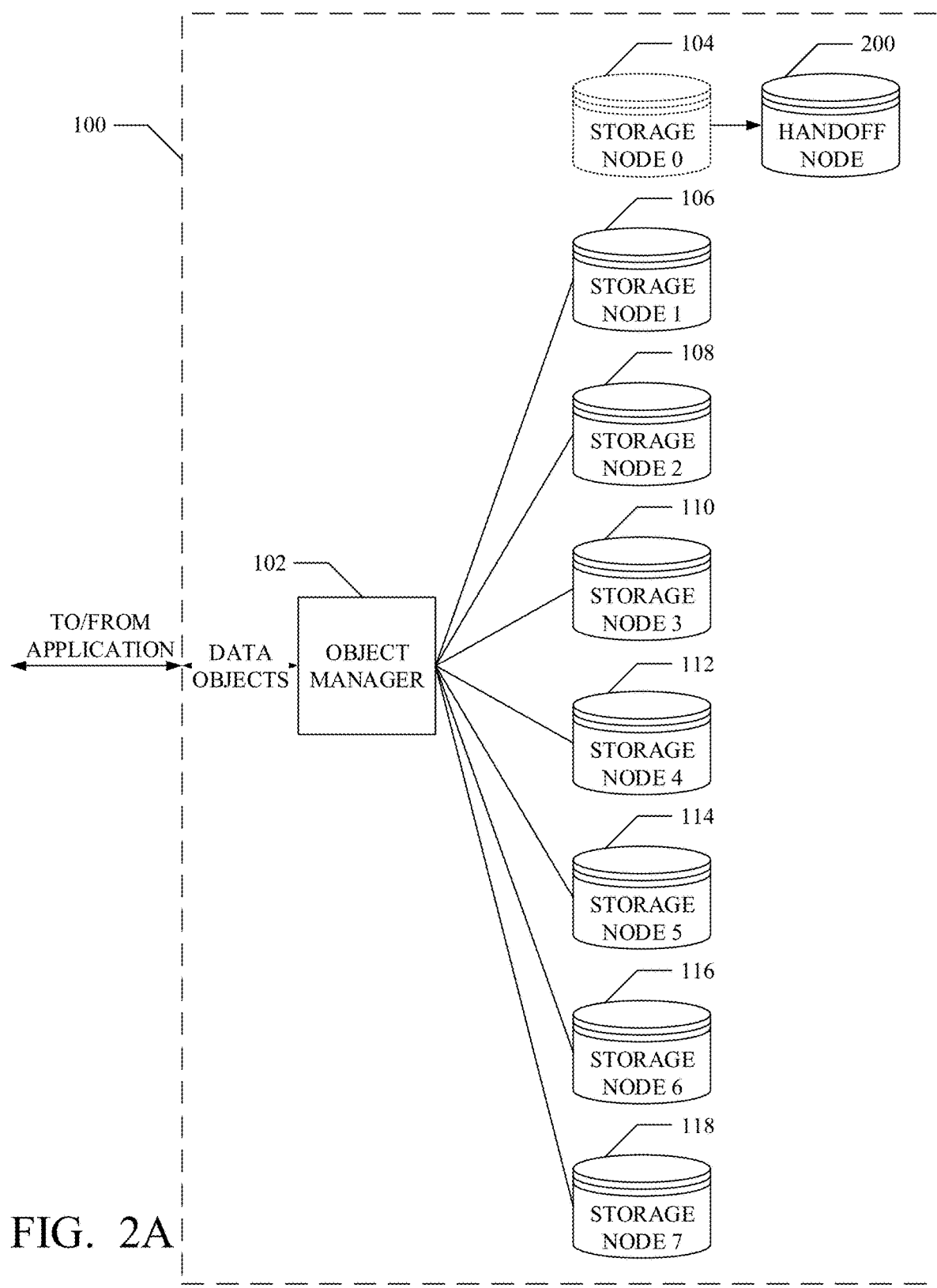
FIGS. 2A-2B are block diagrams illustrating an example topology change of the example distributed storage system of FIG. 1.
Figure 2B:
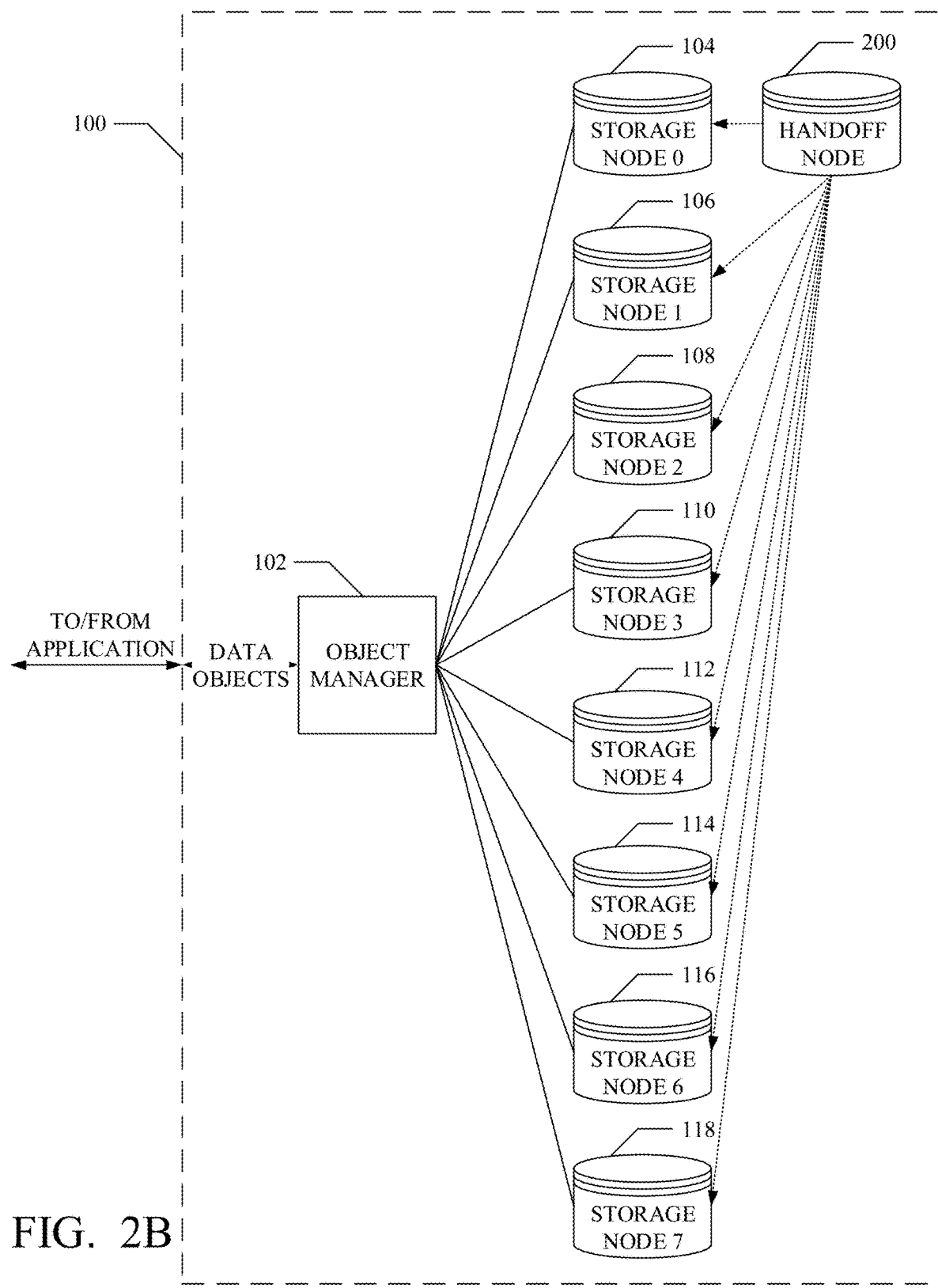

FIGS. 2A-2B illustrate a block diagram of the example distributed storage system 100 undergoing a topology change. In the illustrated example of FIG. 2A, the example distributed storage system 100 includes a second topology having the example object manager 102 communicatively connected to example storage node 1 106, example storage node 2 108, example storage node 3 110, example storage node 4 112, example storage node 5 114, example storage node 6 116, and example storage node 7 118. In the illustrated example of FIG. 2A, storage node 0 104 has gone offline due to an outage of some kind (e.g., network outage, server failure, etc.). In some examples, when storage node 0 104 goes offline, data from storage node 0 104 may be stored in a handoff node 200 (e.g., an extra server, another storage node acting as a handoff node, a new server, etc.). While the illustrated example of FIG. 2A depicts a single handoff node 200, any number of handoff nodes may be present, added, removed, etc.

In some examples, when storage node 0 104 goes offline, the data stored therein becomes unavailable. Therefore, in the illustrated example of FIG. 2, the data (e.g., a fragment) from storage node 0 104 is rebuilt (e.g., recreated) based on the remaining fragments in the other nodes and the error correction coding. For example, if the object manager breaks an object into eight fragments (e.g., 6 data fragments and 2 parity fragments) and distributes the eight fragments into eight nodes (e.g., storage nodes 104, 106, 108, 110, 112, 114, 116, 118) and storage node 0 104 goes offline, the object manager 102 utilizes the other seven fragments from storage nodes 106, 108, 110, 112, 114, 116, 118 and the error correction coding (e.g., equations, processes, functions, etc.) to recreate the missing eighth fragment and store it in the handoff node 200.

In the illustrated example of FIG. 2B, the example distributed storage system 100 includes the first topology having the example object manager 102 communicatively connected to example storage node 0 104, example storage node 1 106, example storage node 2 108, example storage node 3 110, example storage node 4 112, example storage node 5 114, example storage node 6 116, and example storage node 7 118. For example, the outage that caused storage node 0 104 to go offline is corrected. In some examples, once the outage is corrected (e.g., storage node 0 104 comes back online), the object manager 102 sends the fragment within the handoff node 200 to one or more of the storage nodes 104, 106, 108, 110, 112, 114, 116, 118 within the distributed storage system, depending on the policies of the distributed storage system. For example, the object manager 102 may send the fragment from the handoff node 200 to storage node 2 108. In such examples, storage node 0 104 and storage node 2 108 both contain the same fragment (e.g., creating an error in the code word) because the fragment that was in the storage node 0 104 when it went offline is still located in the storage node 0 104 when it comes back online, and the fragment that was in the storage node 2 108 is overwritten with the fragment from the handoff node 200. In some examples, the object manager 102 sends the fragment from the handoff node 200 to all the storage nodes 104, 106, 108, 110, 112, 114, 116, 118. In such examples, all the fragments may be overwritten with the fragment from the handoff node 200 (e.g., creating at least seven errors). As disclosed herein, when more than p errors occur (e.g., p=2 in the above example), then the example object manager 102 fails to reproduce the example code word and the example distributed storage system 100 fails to recover the object associated with that code word.

In some examples, the fragment originally stored in the storage node 0 104 may be relocated to the storage node 2 108 and the fragment originally stored in the storage node 2 108 may be relocated to the storage node 0 104 (e.g., the first fragment "A" is stored in the storage node 2 108 and the third fragment "C" is stored in the storage node 0 104). As described above, in some examples the example object manager 102 (FIGS. 1-2B) concatenates, or otherwise arranges, the fragments according to the order of the storage nodes. As a result, the object manager 102 of FIGS. 1-2B would compile the fragments stored within the example storage nodes 104, 106, 108, 110, 112, 114, 116, 118 to produce a code word C, B, A, D, E, F, Y, Z, instead of the original code word A, B, C, D, E, F, Y, Z. In other words, two "errors" have occurred (e.g., errors marked by x's in the following sequence: x, B, x, D, E, F, Y, Z). If the error correction coding used to create the code word is only able to correct for one error in the code word, the example object manager 102 would fail to recreate the original code word even when the object is encoded with the error correction coding. However, in the examples wherein the order of the fragments does not matter, no "errors" would have occurred.

Multiple errors may occur in a code word due to, for example, multiple nodes storing fragments becoming inaccessible. When the number of errors exceeds the error correction capacity of the error correction coding, the object manager 102 of FIGS. 1-2B cannot recreate the original code words and thus the objects from which the code words were created. For example, if an error correction coding can correct up to 4 errors and 5 errors occur, the error correction coding cannot reconstruct the code word leading to a reconstruction error.

In some examples, a plurality of nodes may become unavailable (e.g., including one or more handoff nodes). Thus a fragment stored in a first node may be handed off (e.g., rebuilt based on error correction coding) to one of many different nodes. Additionally, fragments may be redistributed across any and/or all available nodes. In some examples, as the number of inaccessible nodes increases and/or the number of data redistributions increases, the location to which a fragment has been relocated becomes increasingly obscure. If a fragment cannot be located, the object manager 102 treats the missing fragment as an error. As disclosed herein, if enough other fragments are available, the object manager 102 can recreate a missing fragment. However, when multiple errors occur and/or there are multiple missing fragments, the object manager 102 cannot reconstruct the code word and the object associated with the code word.

Example methods and apparatus of the present disclosure assign indices to fragments in distributed storage systems to uniquely identify fragments and determine which fragments are stored within which node at any point in time. For example, once an index is assigned to a fragment (e.g., based on the node where it was originally stored), that fragment index remains the same even when the fragment is relocated to a different node. In some examples, the fragments (and the corresponding indices) are relocated based on the assigned indices. For example, if the fragment index of the fragment within a node does not match the node index, the fragment is relocated to the node that has a node index matching the fragment index. While examples disclosed herein refer to the storage of object fragments, the teachings of this disclosure are also applicable to the storage of whole objects (e.g., not fragmented), object segments, etc. Further, the fragments may be of any size (e.g., bytes, megabytes, gigabytes, etc.).

Figure 3A:
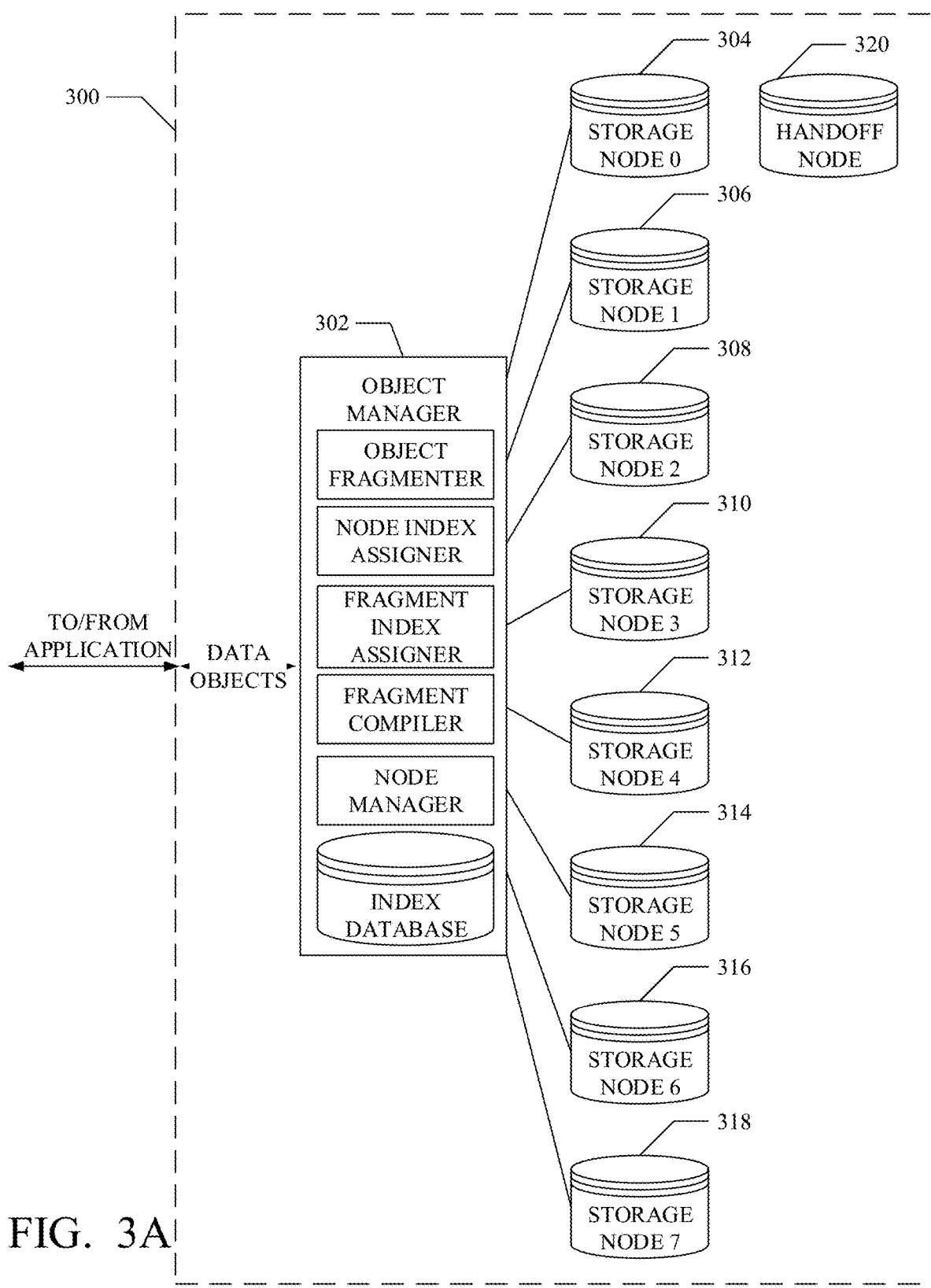
FIG. 3A is a block diagram illustrating an example object manager storing an object in an example distributed storage system.
Figure 3B:
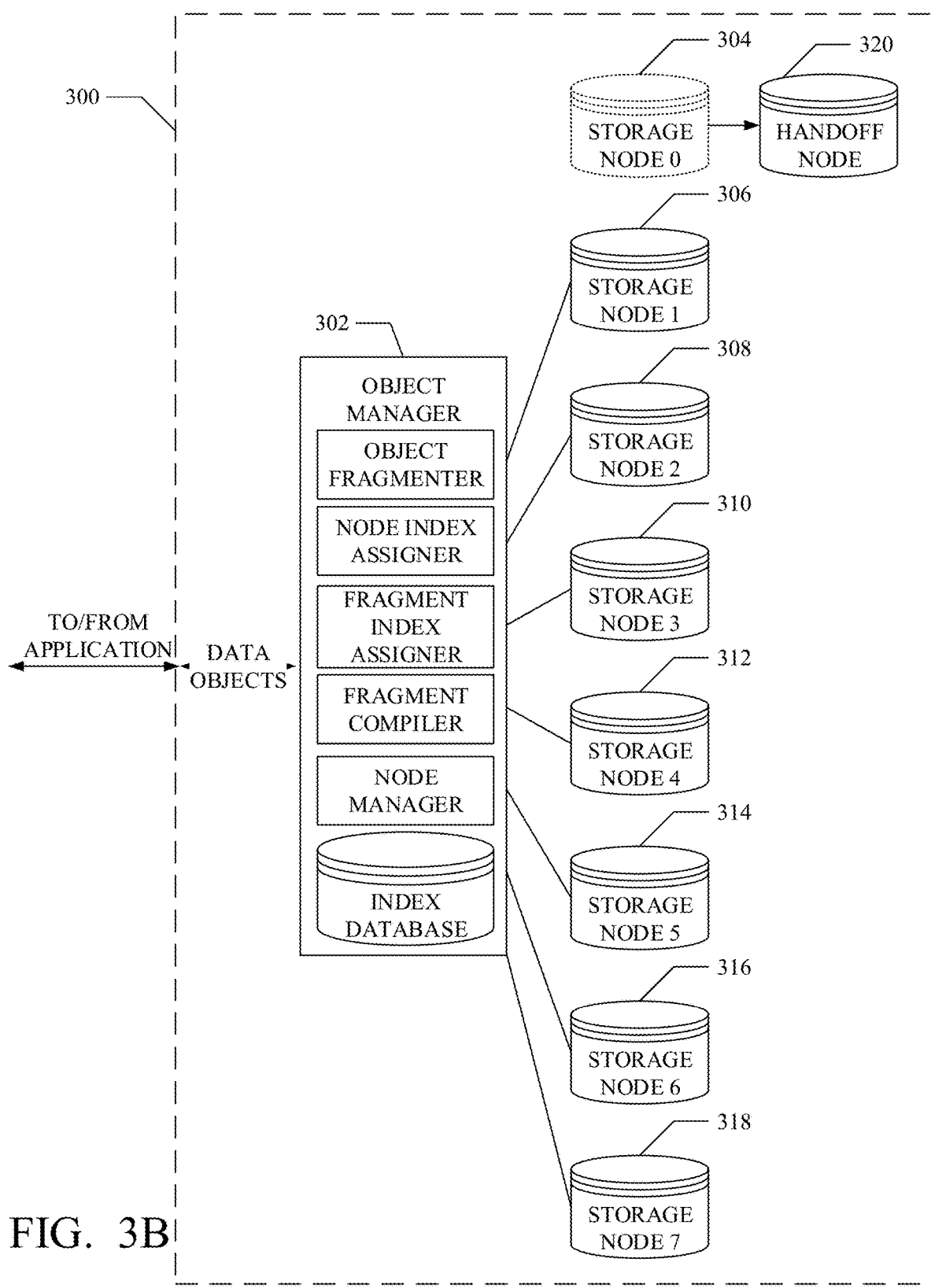
FIGS. 3B-3C are block diagrams illustrating an example topology change of the example distributed storage system of FIG. 3A.
Figure 3C:
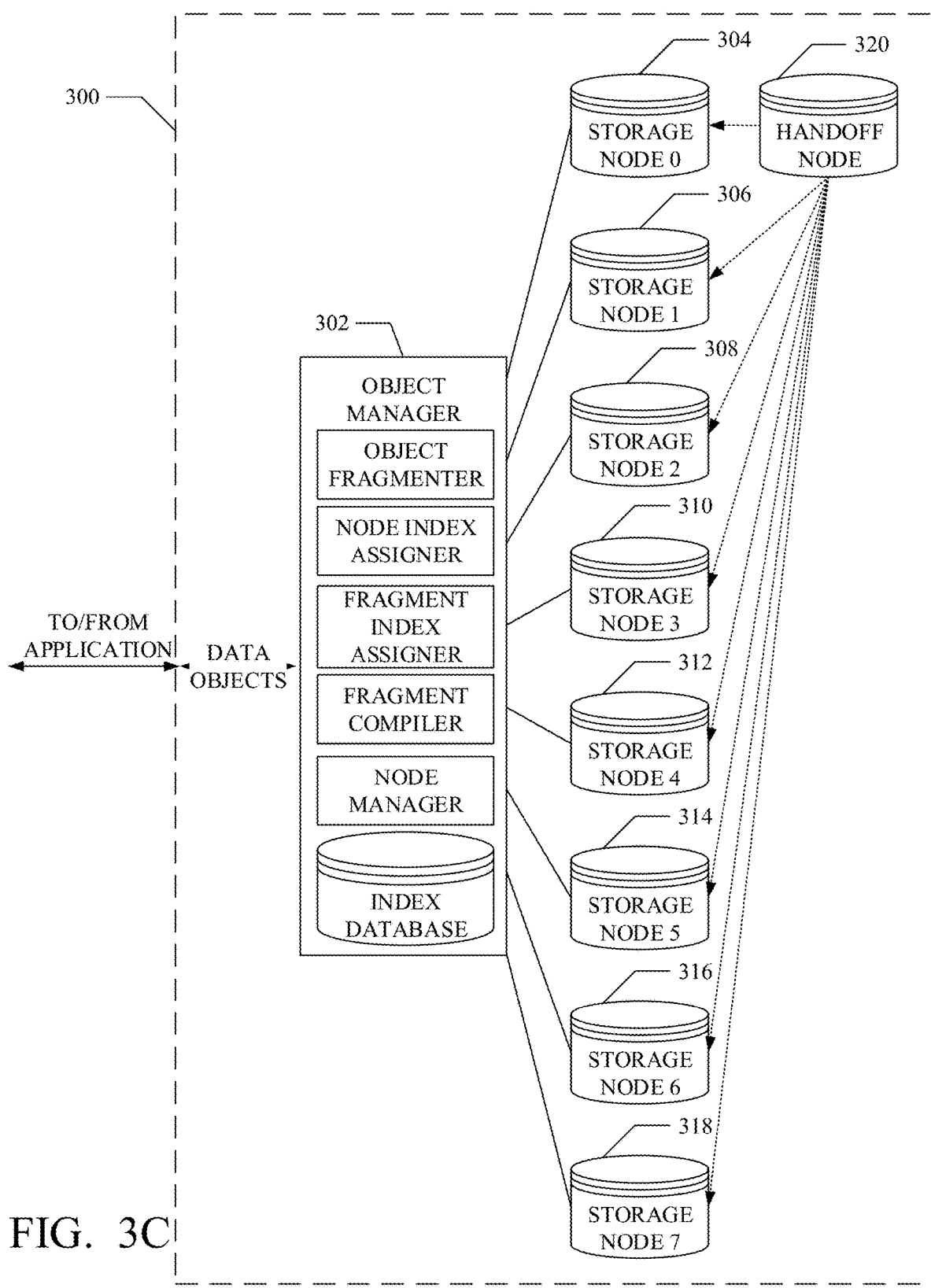

FIGS. 3A-3C are block diagrams illustrating an example distributed storage system 300 in which an example object manager 302 stores and/or retrieves an object in accordance with the teachings of this disclosure. In operation, the example object manager 302 of FIGS. 3A-3C is responsible for managing the example distributed storage system 300. For example, the example object manager 302 of FIGS. 3A-3C receives requests from applications for the storage of objects to and/or retrieval of objects from the example distributed storage system 300. In some examples, the object manager 302 of FIGS. 3A-3C uses one or more error correction codes to break an object into code word fragments. The example object manager 302 of FIGS. 3A-3C identifies locations (e.g., nodes) where the code word fragments are to be stored and/or where code word fragments are currently stored. In some examples, if a node is unavailable when storing, the object manager 302 of the example of FIGS. 3A-3B will identify a handoff node for temporary storage. In some examples, the object manager 302 of FIGS. 3A-3C redistributes fragment across the distributed storage system 300. In some examples, the object manager 302 of FIGS. 3A-3C is implemented to be a proxy server.

In the illustrated example of FIG. 3A, the example distributed storage system 300 includes a first topology having the example object manager 302 communicatively connected to example storage node 0 304, example storage node 1 306, example storage node 2 308, example storage node 3 310, example storage node 4 312, example storage node 5 314, example storage node 6 316, and example storage node 7 318. In some examples, one or more handoff nodes 320 (e.g., an extra server, another storage node acting as a handoff node, a new server, etc.) are available in the distributed storage system 300.

In the illustrated example of FIG. 3A, the example object manager 302 stores fragments in the example storage nodes 304, 306, 308, 310, 312, 314, 316, 318, similar to the example object manager 102 shown in connection with FIG. 1. The object manager 302 applies error correction coding to an example object to create an example code word including data fragments from the example object and parity fragments calculated from the data fragments. The example object manager 302 stores fragments of the example code word in the example storage nodes 304, 306, 308, 310, 312, 314, 316, 318.

For example, for the example code word A, B, C, D, E, F, Y, Z (e.g., based on the example object O and corresponding data fragments A, B, C, D, E, F), the example object manager 302 stores the first fragment "A" in the example storage node 0 304, the example object manager 302 stores the second fragment "B" in the example storage node 1 306, the example object manager 302 stores the third fragment "C" in the example storage node 2 308, the example object manager 302 stores the fourth fragment "D" in the example storage node 3 310, the example object manager 302 stores the fifth fragment "E" in the example storage node 4 312, the example object manager 302 stores the sixth fragment "F" in the example storage node 5 314, the example object manager 302 stores the seventh fragment "Y" in the example storage node 6 316, and the example object manager 302 stores the eighth fragment "Z" in the example storage node 7 318.

In some examples, the storage nodes 304, 306, 308, 310, 312, 314, 316, 318 contain only the fragments of the code word (e.g., object data and parity fragments). Alternatively, the example storage nodes 304, 306, 308, 310, 312, 314, 316, 318 may be separated into buckets, bins, or other storage containers, such that each storage node 304, 306, 308, 310, 312, 314, 316, 318 contains different types and sizes of data along with the fragments of the code word. For example, the storage nodes 304, 306, 308, 310, 312, 314, 316, 318 may contain multiple fragments from different code words, multiple fragments from the same code word, other objects, etc.

However, in some examples, the storage nodes 304, 306, 308, 310, 312, 314, 316, 318, in which the fragments of objects are stored may go offline, fail, begin failing, begin producing errors, or otherwise become inaccessible. To illustrate such an occurrence, the example distributed storage system 300 of FIG. 3B includes a second topology when storage node 0 304 goes offline. The example second topology of the example distributed storage system 300 includes the example object manager 302 communicatively connected to example storage node 1 306, example storage node 2 308, example storage node 3 310, example storage node 4 312, example storage node 5 314, example storage node 6 316, and example storage node 7 318. In the illustrated example of FIG. 3B, example storage node 0 304 has gone offline, is failing, has failed, is producing errors, or is otherwise inaccessible. As disclosed herein, the example object manager 302 reconstructs the fragment (e.g., fragment "A") that was stored in the example storage node 0 304 using the fragments stored in the example storage nodes 304, 306, 308, 310, 312, 314, 316, 318. The example object manager 302 stores the reconstructed fragment in the example handoff node 320.

FIG. 3C is a block diagram illustrating the example distributed storage system 300 including a third topology when storage node 0 304 comes back online. In the illustrated example of FIG. 3C, the third topology of the example distributed storage system 300 includes the example object manager 302 communicatively connected to example storage node 0 304, example storage node 1 306, example storage node 2 308, example storage node 3 310, example storage node 4 312, example storage node 5 314, example storage node 6 316, and example storage node 7 318. For example, the outage that caused storage node 0 404 to go offline is corrected.

In some examples, once the outage is corrected (e.g., storage node 0 304 comes back online), the object manager 302 sends the fragment within the handoff node 320 (e.g., fragment "A") to one or more of the storage nodes 304, 306, 308, 310, 312, 314, 316, 318 within the distributed storage system, depending on the policies of the distributed storage system. For example, the object manager 302 may send the fragment (e.g., fragment "A") from the handoff node 320 to storage node 2 308. In such examples, storage node 0 304 and storage node 2 308 both contain the same fragment (e.g., fragment "A"). However, as disclosed herein, the example object manager 302 assigns indices to fragments for unique identification. Therefore, while both storage node 0 304 and storage node 2 308 may contain the same fragment (e.g., fragment "A"), storage node 2 308 contains an additional distinguishable fragment (e.g., fragment "C").

In some examples, the fragment originally stored in the storage node 0 304 may be relocated to storage node 2 308 and the fragment originally stored in the storage node 2 308 may be relocated to the storage node 0 304 (e.g., the first fragment "A" is stored in the storage node 2 308 and the third fragment "C" is stored in the storage node 0 304). However, upon request by the example object manager 302, each node can identify which fragment is stored within each node. Thus, the example object manager 302 can determine where each fragment is located and how to arrange the fragments prior to and/or during compilation of an example code word. In contrast, the example object manager 102 of FIGS. 1-2B would be unaware that the first fragment "A" is stored in the storage node 2 308 and the third fragment "C" is stored in the storage node 0 304.

In some examples, the object manager 302 identifies that the fragment stored in the handoff node 320 (e.g., fragment "A") belongs in the storage node 0 304 and moves the fragment from handoff node 320 to storage node 0 304 accordingly. Example methods and apparatus disclosed herein advantageously encode a fragment index into code word fragments to track and/or relocate the code word fragments to reduce and/or eliminate reconstruction error. Some such example methods and apparatus reconstruct original objects when a topology of a distributed storage system is changed after storage. Such example methods and apparatus are further described below in connection with the example object manager 302 of FIGS. 3A-3C. As will be apparent from the disclosure below, unlike the object manager 102 of FIGS. 1-2B, the example object manager 302 of the illustrated example of FIGS. 3A-3C compiles the code word fragments stored within the example storage nodes 302, 306, 308, 310, 312, 314, 316, 318 to produce original code words. For example, the object manager 302 of FIGS. 3A-3B recreates the code word A, B, C, D, E, F, Y, Z, even when the topology of the distributed storage system 300 changes.

Figure 4:
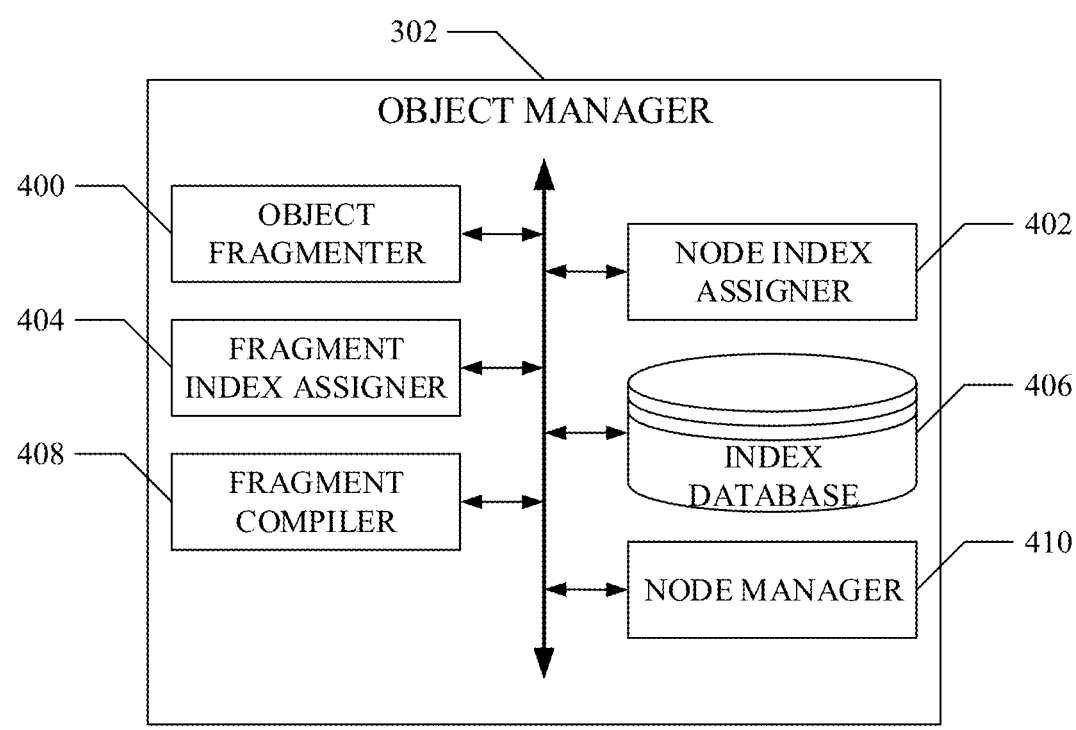
FIG. 4 is a block diagram illustrating an example implementation of the example object manager of FIGS. 3A-3C.

FIG. 4 is a block diagram illustrating an example implementation of the example object manager 302 of FIGS. 3A-3C. The example object manager 302 includes an example object fragmenter 400, an example node index assigner 402, an example fragment index assigner 404, an example index database 406, an example fragment compiler 408, and an example node manager 410.

The example object fragmenter 400 of FIG. 4 receives objects from applications and receives requests to store the objects in the distributed storage system 300 (FIGS. 3A-3C). In the illustrated example, the object fragmenter 400 encodes objects with error correction coding. In some examples, the object fragmenter 400 access an error correction coding library for error correction coding equations, processes, functions, etc. Based on the error correction coding, the example object fragmenter creates code words from the objects. The example code words include data fragment corresponding to the example object and one or more check symbols (e.g., parity fragments). As used herein, an example code word is defined to be an object encoded via error correction coding having data fragments and parity fragments.

The example object fragmenter 400 of FIG. 4 breaks up the example codes words into code word fragments. The example code word fragments may be any size (e.g., bit-sized, byte-sized, megabyte-sized, etc.). Additionally, the example object fragmenter 400 distributes and/or stores the example code word fragments into storage nodes based on a node index and/or a fragment index. In some examples, the object fragmenter 400 uses one or more rings (e.g., consistent hashing rings), which represent mappings between names of objects/fragments/containers stored on a disk and their physical location.

In some examples, the example object fragmenter 400 stores multiple fragments from different code words within the storage nodes 304, 306, 308, 310, 312, 314, 316, 318. In examples wherein the storage nodes 304, 306, 308, 310, 312, 314, 316, 318 contain multiple fragments from different code words, the example object fragmenter 400 stores indications of which object with which the example fragments are associated. In some examples, the example object fragmenter 400 stores indications of the object from which the fragments are based within metadata associated with the fragments. In some examples, the example object fragmenter 400 stores indications of the object from which the fragments are based in an identifier (e.g., a name) of the fragment (e.g., obj1_fragment1, obj2_fragment1, etc.).

Additionally or alternatively, the example object fragmenter 400 of FIG. 4 separates objects into segments (e.g., without calculating parity segments) prior to encoding and fragmenting the objects. For example, an object may be 100 megabytes and the example object fragmenter 400 can separate the object into two 50 megabyte segments without calculating parity segments. The example object fragmenter 400 encodes the segments with error correction coding and fragment code words based on the segments, instead of based on the objects as disclosed herein. For example, a 100 megabyte object is broken into two 50 megabyte segments, each segment being encoded with erasure coding to break the segments into five 10 megabyte data fragments and two 10 megabyte parity fragments (e.g., calculated from the segment data fragments). In such examples, large objects can be separated into a collection of manageable smaller segments and/or code word fragments. In such examples, the parity fragment calculations may take less time and processing. For example, instead of calculating four 10 megabyte parity fragments from ten 10 megabyte data fragments, two megabyte parity fragments are calculated for five 10 megabyte data fragments twice.

The example node index assigner 402 of FIG. 4 generates a node index to assign identifiers to nodes (e.g., servers) that will store code word fragments. In some examples, the node index assigner 402 initially assigns the node index based on the object name (e.g., object node 0, object node 2, etc.) when fragments of the object are to be stored in respective nodes such that the same set of nodes are retrieved on subsequent requests for that object. In some examples, the node index is derived from a hash of the object's name (e.g., object name 1→01, object name 2→02, etc.). In the illustrated example of FIGS. 3A-3C, the node index identifies the example storage nodes 304, 306, 308, 310, 312, 314, 316, 318. In the illustrated example, the node index assigner 402 assigns a node index with zero-based values (e.g., the first index begins with zero). For example, the first storage node 304 is storage node 0, the second storage node 306 is storage node 1, the third storage node 308 is storage node 2, the fourth storage node 310 is storage node 3, the fifth storage node 312 is storage node 4, the sixth storage node 314 is storage node 5, the seventh storage node 316 is storage node 7, and the eighth storage node 318 is storage node 7.

In some examples, the node index is numerical. In some examples, the node index is alpha-numerical. In the illustrated example of FIG. 4, the node index assigner 402 stores the node index in the index database 406. The labels "storage node 0," "storage node 1," "storage node 2," "storage node 3," "storage node 4," "storage node 5," "storage node 6," and "storage node 7" of FIGS. 3A-3C are shown for illustrative purposes only.

The example fragment index assigner 404 of FIG. 4 generates a fragment index assigning identifiers to the code word fragments themselves. In some examples, the fragment index is based on the node index (e.g., the code word fragment to be stored in the storage node 0 is indexed as 0, the code word fragment to be stored in the storage node 1 is indexed as 1, etc.). In some examples, the fragment index assigner 404 encodes the fragment index into an identifier of the code word fragment, such as, for example, the name of the code word fragment (e.g., fragment name 0). In some examples, the fragment index assigner 404 assigns the fragment index between the identifier (e.g., name) of the code word fragment and the file extension (e.g., .data) of the code word fragment (e.g., fragmentname0.data). In some examples, the fragment index assigner 404 encodes the fragment index into metadata associated with the code word fragment. In some examples, the fragment index is numerical, alphabetical, alpha-numerical, etc.

Additionally or alternatively, the example fragment index assigner 404 may assign additional indices to other variations of objects (e.g., segments) as discussed herein. For example, the fragment index assigner 404 assigns an index to an object, an index to a segment of the object, and an index to a code word fragment of the segment of the object (e.g., object A, segment a, fragment 1).

In the illustrated example of FIG. 4, the example index database 406 is a storage device (e.g., hard drives, solid state drives, floppy disks, compact disks, Blu-ray disks, RAID systems, and digital versatile disks (DVD), etc.) that stores node indices and/or copies of fragment indices. In some examples, the index database 406 includes mapping tables associating node indexes with fragment indices.

The example fragment compiler 408 of FIG. 4 receives requests from applications to retrieve objects stored in the example distributed storage system 300 (FIGS. 3A-3C). Based on the requests, the example fragment compiler 408 requests code word fragments from storage nodes. In some examples, the fragment compiler 408 checks fragment indices associated with the code word fragments to determine whether the fragment indices match a node index.

When a fragment index matches a node index, the example fragment compiler 408 of FIG. 4 compiles code word fragments together according to the node index and/or the fragment index (e.g., because they are the same). For example, when the example code word A, B, C, D, E, F, Y, Z, is stored within the example storage nodes 304, 306, 308, 310, 312, 314, 316, 318 the example fragment compiler 408 requests the first code word fragment (e.g., fragment "A") from the example storage node 0 304. If the fragment index (e.g., fragment 0) matches the node index (e.g., storage node 0), the example fragment compiler 408 retrieves the first code word fragment (e.g., fragment "A") and begins to recreate the example code word using the retrieved code word fragment as the beginning of the code word.

Similarly, the example fragment compiler 408 of FIG. 4 requests and retrieves the remaining code word fragments. In some examples, the fragment compiler 408 concatenates the fragments when the fragment index of each fragment matches the node index. For example, the example fragment compiler 408 retrieves the second code word fragment from the corresponding storage node 306 and concatenates the second code word fragment to the first code word fragment (e.g., places the second code word fragment in the second position A, B). The example fragment compiler 408 retrieves the third code word fragment from the corresponding storage node 2 308 and concatenates the third code word fragment to the first and second code word fragments (e.g., places the third code word fragment in the third position A, B, C). The example fragment compiler 408 retrieves the fourth fragment from the corresponding storage node 310 and concatenates the fourth code word fragment to the first, second, and third code word fragments (e.g., places the fourth fragment in the fourth position A, B, C, D), etc. In some examples, the fragment compiler 408 does not concatenate the code word fragments. In some error correction schemes, a code word can be decoded without concatenation as long as enough uniquely identifiable fragments are available for the error correction scheme to correct for the errors/missing fragments.

When a fragment index does not match the node index, the example fragment compiler 408 of FIG. 4 communicates with the node to determine which code word fragment(s) are stored in that node. In such examples, the fragment compiler 408 retrieves and compiles code word fragments together according to the fragment index (e.g., because the node index may be incorrect due to data redistribution, server outage, data loss, etc.).

For instance, assume the code word A, B, C, D, E, F, Y, Z, was initially stored within the example storage nodes 304, 306, 308, 310, 312, 314, 316, 318 (FIG. 3A). Further, assume that after a topology change, example storage node 0 304 currently stores the third fragment "C" of the code word and example storage node 2 308 may currently stores the first fragment "A" of the code word. In such an example, the fragment compiler 408 of FIG. 4 requests the first code word fragment (e.g., fragment "A") from the storage node 0 304 (e.g., because the storage node 0 304 is in the location associated with the first node in the node index). In the illustrated example of FIG. 4, the fragment compiler 408 determines that the fragment index (e.g., fragment 2) does not match the node index (e.g., storage node 0) and thus, the fragment compiler 408 determines that the first code word fragment is not stored in the storage node 0 304 (e.g., the first code word fragment (fragment "A") was requested from the first node, but the third code word fragment (fragment "C") is stored in the first node).

In some examples, the example fragment compiler 408 determines the third code word fragment is stored in the storage node 0 304 based on the fragment index of that code word fragment (e.g., fragment index is 2, which refers to the third code word fragment (fragment "C") in a zero-based value scheme) without retrieving the code word fragment. In some examples, the fragment compiler 408 retrieves the third code word fragment (e.g., fragment "C") in response to an application request, and the fragment compiler 408 begins to recreate the example code word by placing the retrieved code word fragment in the third position of the code word (e.g., "_, _, C, _ . . . ") based on the fragment index.

In some examples, the example fragment compiler 408 of FIG. 4 requests and retrieves the remaining code word fragments. For example, the fragment compiler 408 retrieves the second code word fragment from the corresponding storage node 1 306 and places the retrieved code word fragment in the second position (e.g., "_, B, C, _ . . . "). The example fragment compiler 408 retrieves the first code word fragment from the corresponding storage node 0 304 and places the retrieved code word fragment in the first position (e.g., "A, B, C, _ . . . "). The example fragment compiler 408 retrieves the fourth code word fragment from the appropriate storage node 3 310 and places the fourth code word fragment in the fourth position (e.g., "A, B, C, D, . . . "), etc. By indexing the example fragments as disclosed herein, the example object manager 302 recreates code words, and thus the objects from which the code words are generated, from fragments even when the fragments have been relocated (e.g., redistributed).

In some examples, the example fragment compiler 408 recreates missing and/or erred fragments. For example, in the illustrated example of FIG. 3B when example storage node 0 304 goes offline, the fragment stored therein (e.g., fragment "A") becomes unavailable. In such examples, the example fragment compiler 408 reconstructs that fragment (e.g., fragment "A") using the error correction coding and the remaining fragments from example storage nodes 306, 308, 310, 312, 314, 316, 318. Additionally or alternatively, the example fragment compiler 408 uses the error correction coding when requests for the fragments of the object return one or more erred fragments and/or when requests for the fragments of the object result in missing fragments. For example, if the example fragment compiler 408 requests eight unique fragments (e.g., A, B, C, D, E, F, Y, Z) from the eight storage nodes and only receives seven unique fragments (e.g., A, B, B, D, E, F, Y, Z), the example fragment compiler 408 recreates the third fragment (e.g., fragment "C") from the non-erred fragments (e.g., A, B, D, E, F, Y, Z).

In some examples, the node manager 410 of FIG. 4 identifies when code word fragments are located in nodes different from where the code word fragments were originally stored and relocates them accordingly. For example, the node manager 410 determines for the storage node 0 304 that the fragment index (e.g., fragment 2) does not match the node index (e.g., storage node 0). The example node manager 410 determines that the third code word fragment (e.g., fragment "C") is stored in the storage node 0 304 based on the fragment index (e.g., fragment 2 is associated with the third code word fragment). Additionally, the example node manager identifies a storage node associated with the fragment index (e.g., storage node 2 is associated with the fragment index (e.g., 2) of the third code word fragment (e.g., fragment "C"). The example node manager 410 moves the third code word fragment into the storage node 2 308. In such examples, data within the storage node 2 308 will not be overwritten because the third code word fragment is distinguishable from any other data within the storage node 2 (e.g., distinguished by the fragment index).

If there are additional fragments within the example storage node 0 304, the above process repeats. If there are no additional fragments in the example storage node 0 304, the example node manager 410 moves onto examining/processing the next node. For example, the example node manager 410 determines that the first code word fragment (e.g., fragment "A") is stored in the storage node 2 308 based on the fragment index (e.g., fragment 0 is associated with the first code word fragment). Next, the example node manager 410 identifies the storage node associated with the fragment index (e.g., storage node 0 is associated with the fragment index (0) of the first code word fragment). The example node manager 410 moves the first code word fragment into the storage node 0 304. Such processing may be performed in parallel as opposed to the serial processing described above. Accordingly, the example node manager 410 identifies and relocates code word fragment(s) based on the fragment indic(es) and/or the node indic(es).

In operation, the example object fragmenter 400 of FIG. 4 receives an example object from an application. In the illustrated example, the object fragmenter 400 applies error correction coding to create a code word based on the example object. For example, the object fragmenter 400 calculates one or more parity fragments to add to data fragments of the object. The example object fragmenter 400 breaks up the example code word (e.g., the data fragments plus the parity fragments) into code word fragments.

In the illustrated example of FIG. 4, the node index assigner 402 generates a node index. In some examples, the node index is associated with the object (e.g., based on a name of the object). In some examples, the node index assigner 402 stores the node index in the index database 406. Additionally, the example fragment index assigner 404 generates an example fragment index. In some examples, the fragment index is based on the node index (e.g., identical to the node index at the time of storage). The example object fragmenter 400 encodes the code word fragments with the example fragment index. In some examples, the fragment index is encoded into an identifier of the code word fragment (e.g., the fragment name). In some examples, the fragment index is encoded into metadata associated with the code word fragment. The example object fragmenter 400 stores the code word fragments and the corresponding fragment indices in respective storage nodes (e.g., storage nodes 304, 306, 308, 310, 312, 314, 316, 318) according to the example node index. The example fragmenter 400 encodes the fragment index in the code word fragments themselves such that redistribution of the code word fragments into new nodes does not obfuscate the original configuration.

In some examples, one or more of the example storage nodes 304, 306, 308, 310, 312, 314, 316, 318 go offline after fragments are stored therein, thereby making fragments unavailable. For example, in the illustrated example of FIG. 3B, when example storage node 0 304 goes offline, the fragment stored therein (e.g., fragment "A") becomes unavailable. In such examples, the example fragment compiler 408 reconstructs the unavailable fragment (e.g., fragment "A") using the error correction coding and the available fragments from example storage nodes 306, 308, 310, 312, 314, 316, 318. The example fragmenter 400 stores the recreated fragment in the example handoff node 320. This process may occur many times during the storage of the example fragments, occur in different handoff nodes, and may continue so long as less than p fragments are erred or become unavailable.

The example fragment compiler 408 of FIG. 4 receives a request from the application for the example object stored in the example distributed storage system 300 (FIGS. 3A-3C). The example fragment compiler 408 sends requests to the storage nodes according to the example node index stored in the example index database 406.

In the illustrated example, when the fragment compiler 408 of FIG. 4 sends a request (e.g., a message) to the storage node 0 304 for a first code word fragment, the storage node 0 304 responds to the fragment compiler 408 indicating the fragment index of the code word fragment stored therein. In some examples, the fragment compiler 408 receives a response from the storage node 0 304 that the fragment index of the code word fragment stored therein indicates that the code word fragment is not the first code word fragment (e.g., node 0 does not have fragment 0). In some examples, the fragment compiler 408 receives a response from the storage node 0 304 that the fragment index of the code word fragment stored therein indicates that the code word fragment is a different code word fragment (e.g., node 0 has fragment 2). In some examples, the fragment compiler 408 receives a response from the storage node 0 304 that the fragment index of the code word fragment stored therein indicates that the code word fragment is not the first code word fragment and the code word fragment stored therein is a different code word fragment (e.g., node 0 does not have fragment 0; node 0 has fragment 2). In some examples, the fragment compiler 408 receives a response from the storage node 0 304 that multiple code word fragments are stored in the storage node 0 304 (e.g., node 0 has fragment 0 and fragment 2).

In some examples, the fragment compiler 408 determines whether the fragment index of the code word fragment stored in the storage node 0 304 matches the node index (e.g., is fragment 0 in node 0?). In some examples, the example fragment compiler 408 accesses the fragment index of the code word fragment without retrieving the code word fragment itself. If the example fragment index of the code word fragment stored in the example storage node 0 304 matches the example node index, then the example fragment compiler 408 retrieves the requested code word fragment from the example storage node 0 304. The example fragment compiler 408 compiles code word fragments according to the example node index when the example node index matches the fragment index.

In some examples, if the example fragment index of the code word fragment stored in the example storage node 0 304 does not match the example node index, then the example fragment compiler 408 of FIG. 4 retrieves the code word fragment from the example storage node 0 304 even though that code word fragment was not the requested code word fragment. However, because the example fragment compiler 408 can uniquely identify the retrieved code word fragment by its fragment index, the fragment compiler 408 can compile the original code word correctly. In such examples, the example fragment compiler 408 compiles the code word fragment(s) according to the fragment indic(es) when the example node indic(es) does not match the fragment indic(es).

In some examples, the node manager 410 of FIG. 4 relocates code word fragments into storage nodes based on the fragment index prior to the example fragment compiler 408 requesting and/or retrieving the code word fragment from the storage nodes. For example, the node manager 410 determines whether the fragment index of the code word fragment stored in the storage node 0 304 matches the node index (e.g., is fragment 0 in node 0?). If the example fragment index of the code word fragment stored in the example storage node 0 304 does not match the example node index, then the example node manager 410 identifies the example node associated with a node index matching the fragment index. For example, if fragment 2 is in node 0, the node manager 410 identifies node 2. The example node manager 410 moves the code word fragment from node 0 (e.g., example storage node 0 304) to node 2 (e.g., example storage node 2 308). Similarly, if fragment 0 is in node 2, the example node manager 410 identifies node 0 and moves fragment 0 from node 2 (e.g., example storage node 2 308) to node 0 (e.g., example storage node 0 304). The example node manager 410 may move fragments between nodes one at a time (e.g., serial processing) or at the same time (e.g., parallel processing).

While an example manner of implementing the example object manager 302 of FIGS. 3A-3C is illustrated in FIG. 4, one or more of the elements, processes and/or devices illustrated in FIG. 4 may be combined, divided, re-arranged, omitted, eliminated and/or implemented in any other way. Further, the example object fragmenter 400, the example node index assigner 402, the example fragment index assigner 404, the example index database 406, the example fragment compiler 408, the example node manager 410, and/or, more generally, the example object manager 302, the example storage nodes 304, 306, 308, 310, 312, 314, 316, 318, the example handoff node 320, and/or more generally, the example distributed storage system 300 of FIGS. 3A-3C may be implemented individually and/or collectively by hardware, software, firmware and/or any combination of hardware, software and/or firmware. Thus, for example, any of the example object fragmenter 400, the example node index assigner 402, the example fragment index assigner 404, the example index database 406, the example fragment compiler 408, the example node manager 410, and/or, more generally, the example object manager 302, the example storage nodes 304, 306, 308, 310, 312, 314, 316, 318, the example handoff node 320, and/or more generally, the example distributed storage system 300 of FIGS. 3A-3C could be implemented individually and/or collectively by one or more analog or digital circuit(s), discrete and/or integrated circuitry, logic circuits, glue logic, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example object fragmenter 400, the example node index assigner 402, the example fragment index assigner 404, the example index database 406, the example fragment compiler 408, the example node manager 410, and/or, more generally, the example object manager 302, the example storage nodes 304, 306, 308, 310, 312, 314, 316, 318, the example handoff node 320, and/or more generally, the example distributed storage system 300 of FIGS. 3A-3C is/are hereby expressly defined to include a tangible computer readable storage device or storage disk such as a memory, a digital versatile disk (DVD), a compact disk (CD), a Blu-ray disk, etc. storing the software and/or firmware. Further still, the example object manager 302 of FIGS. 3A-3C may include one or more elements, processes and/or devices in addition to, or instead of, those illustrated in FIG. 4, and/or may include more than one of any or all of the illustrated elements, processes and devices.

Figure 5:
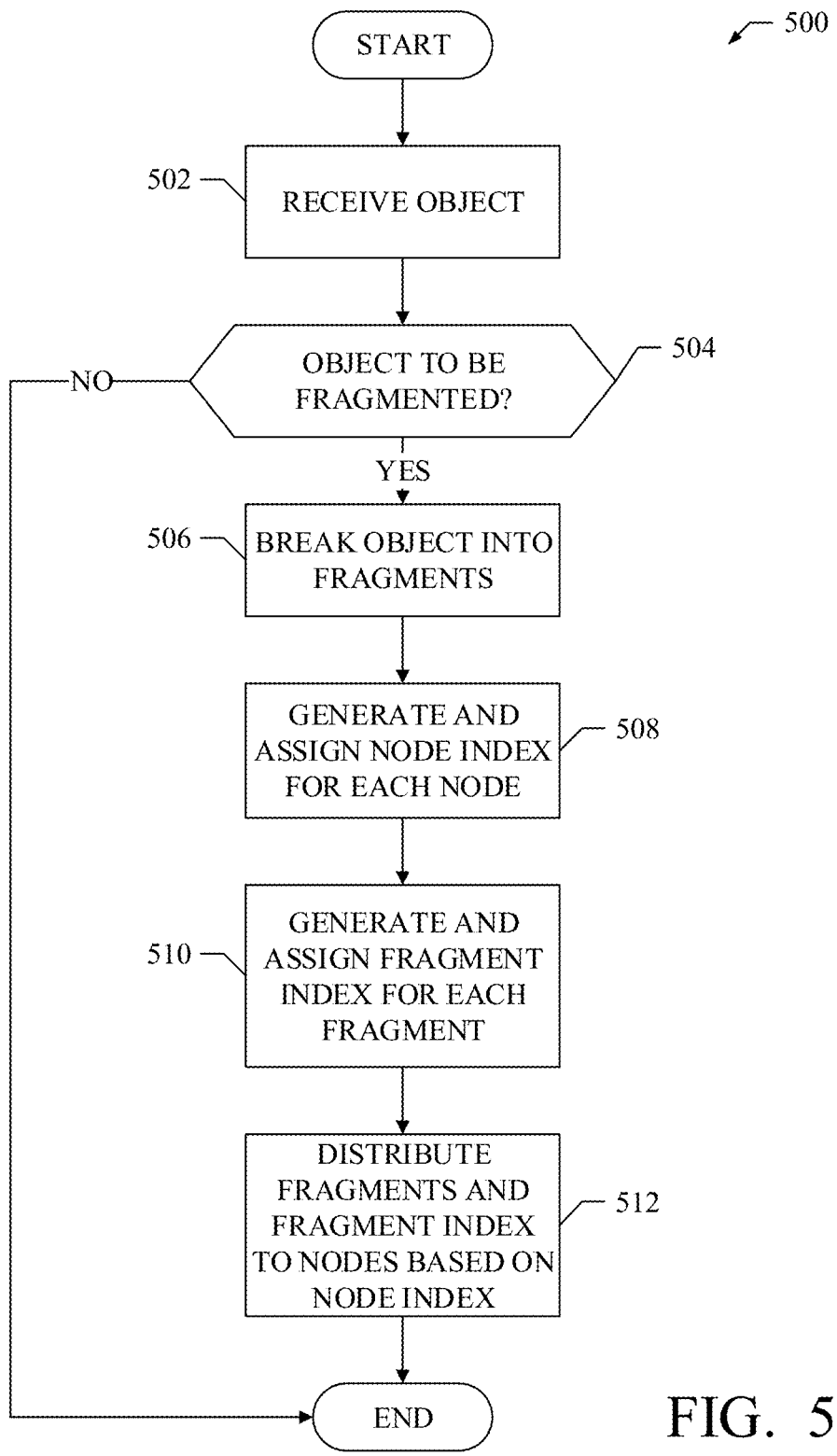
FIGS. 5-7 are example flow diagrams representative of example machine-readable instructions that may be executed to implement the example object manager of FIG. 4.
Figure 6:
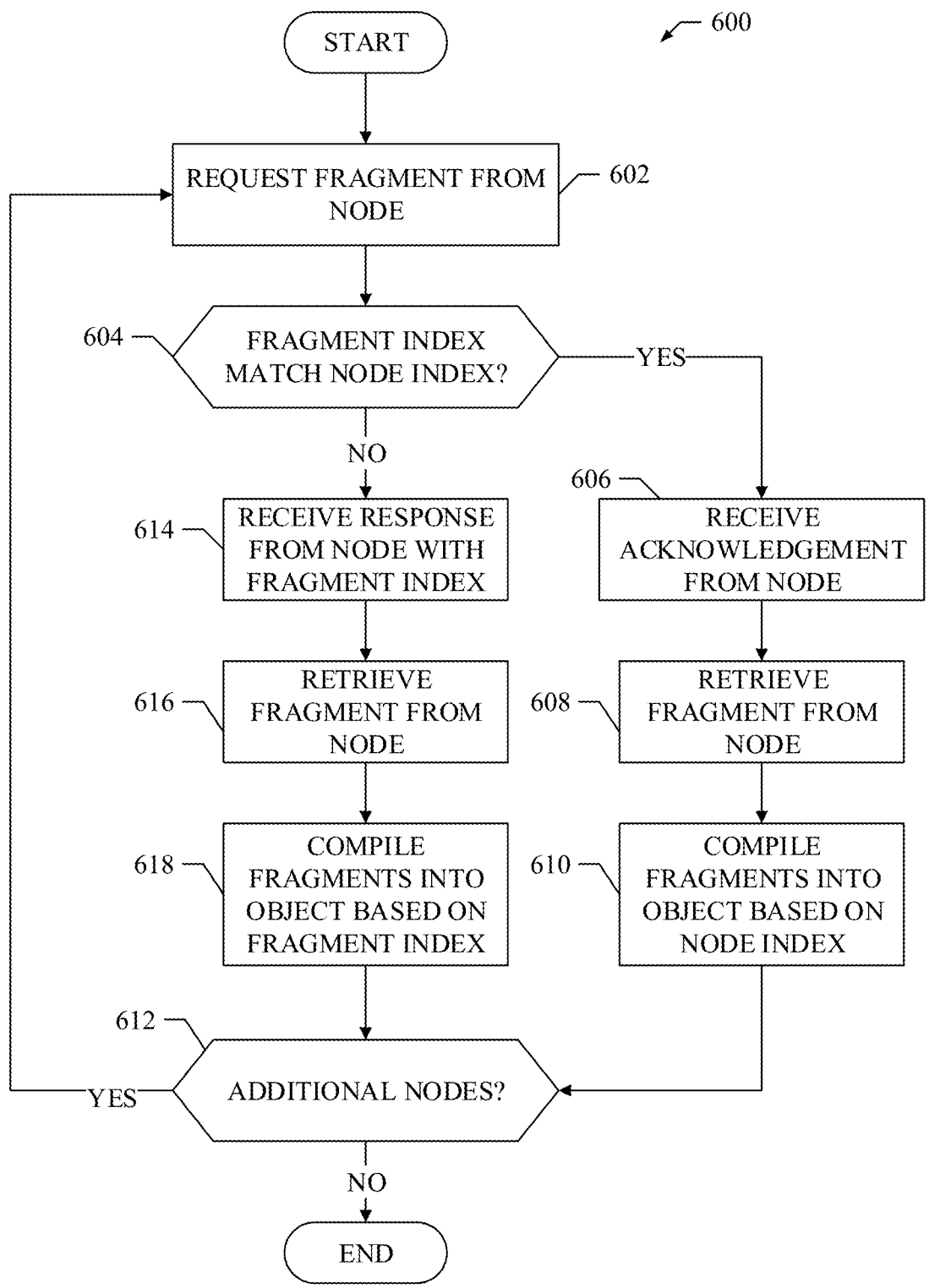
Figure 7:
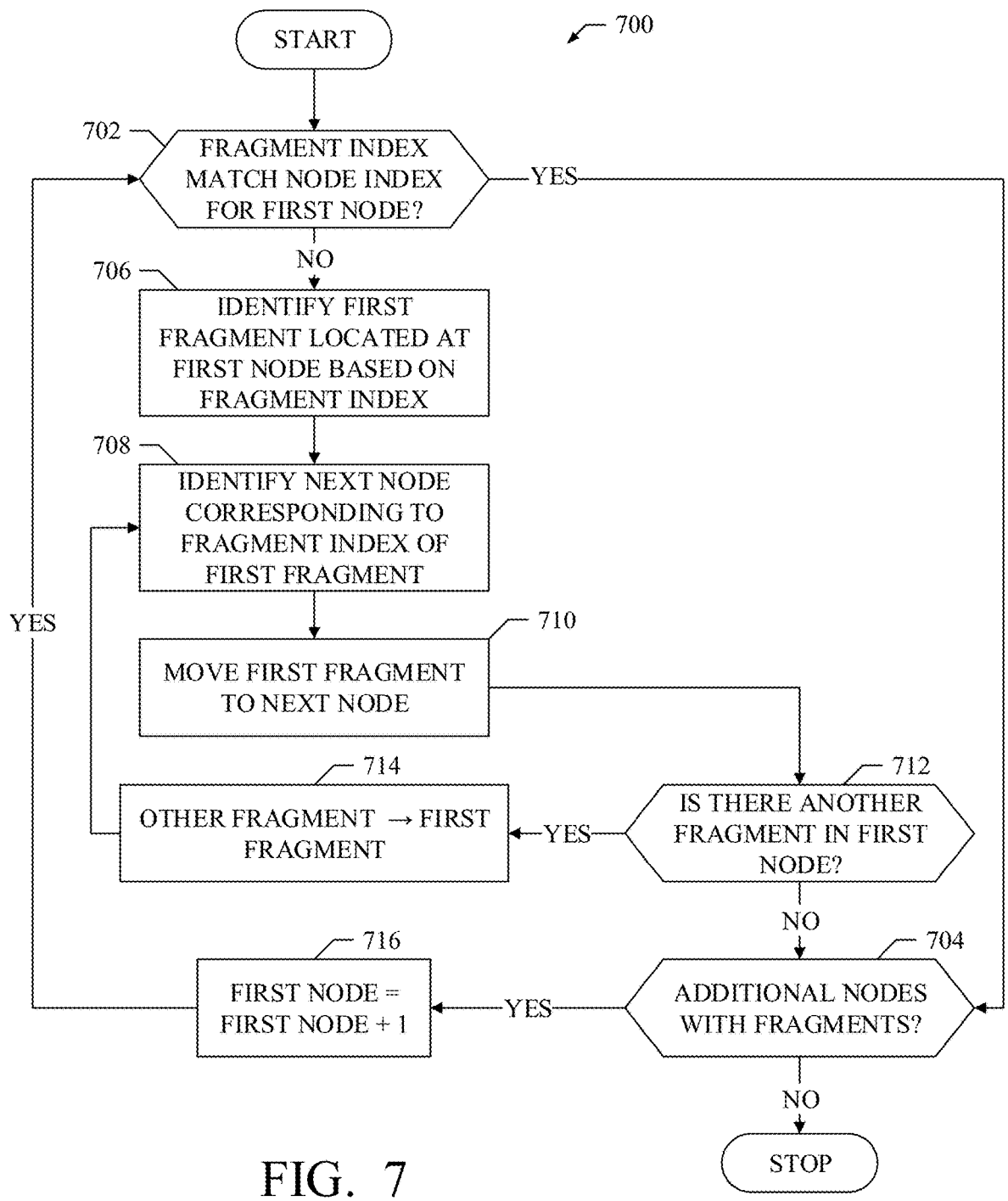

Flowcharts representative of example machine readable instructions for implementing the example object manager 302 of FIG. 4 are shown in FIGS. 5-7. In these examples, the machine readable instructions comprise programs for execution by a processor such as the processor 812 shown in the example processor platform 800 discussed below in connection with FIG. 8. The programs may be embodied in software stored on a tangible computer readable storage medium such as a CD-ROM, a floppy disk, a hard drive, a digital versatile disk (DVD), a Blu-ray disk, or a memory associated with the processor 812, but the entire programs and/or parts thereof could alternatively be executed by a device other than the processor 812 and/or embodied in firmware or dedicated hardware. Further, although the example programs are described with reference to the flowcharts illustrated in FIGS. 5-7, many other methods of implementing the example object manager 302 may alternatively be used. For example, the order of execution of the blocks may be changed, and/or some of the blocks described may be changed, eliminated, or combined.

As mentioned above, the example processes of FIGS. 5-7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 5-7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

FIG. 5 is an example flow diagram representative of example machine-readable instructions 500 that may be executed to implement the example object manager 302 of FIGS. 3A-3C. The example machine-readable instructions 500 of FIG. 5 begin at block 502. At block 502, the example object fragmenter 400 of the example object manager 302 receives an object to be stored in the distributed storage system 300 (FIGS. 3A-3C). In some examples, the object is to be stored in a single storage device. In some examples, the object is to be fragmented. In the illustrated example of FIG. 5, the example object fragmenter 400 determines whether the object is to be fragmented (block 504). In some examples, the object fragmenter 400 determines the object is to be fragmented to provide data durability, reliable data availability and/or error protection/correction. In some examples, the object fragmenter 400 determines to fragment the object based on a policy of the distributed storage system 300. In some examples, the object fragmenter 400 determines to fragment the object based on instructions from an application.

If the example object fragmenter 400 determines that the object is to be fragmented (block 504: YES), control proceeds to block 506. If the example object fragmenter 400 determines that the object is not to be fragmented (block 504: NO), the example machine-readable instructions 500 cease execution.

At block 506, the example object fragmenter 400 breaks the example object into code word fragments. In some examples, the fragmenter 400 breaks the object into fragments and calculates additional fragments (e.g., parity fragments) to create the code word fragments. The example fragmenter 400 determines the number of fragments and/or additional fragments based on the type of error correction coding used to encode the object. For example, the fragmenter 400 can calculate four parity fragments for an object having ten data fragments to create a fourteen fragment code word (e.g., a 10:14 Reed-Solomon coding technique).

Once the example fragmenter 400 has broken the example object into code word fragments, the example node index assigner 402 determines which nodes the code word fragments will be stored in. The example node index assigner 402 generates and assigns an example node index for each node in which a code word fragment will be stored (block 508). In some examples, the node index is based on a name of the object such that the same set of nodes are retrieved on subsequent requests for that object. In some examples, the node index is stored in the index database 406.

Once the example node index assigner 402 determines which nodes in which the code word fragments will be stored (block 508), the example fragment index assigner 404 generates and assigns an example fragment index for each code word fragment (block 510). In some examples, the fragment index is derived from the node index. In some examples, the fragment index is identical to the node index at the time a code word fragment is stored within a corresponding node. In the illustrated example, the fragment index assigner 404 assigns fragment indices to corresponding fragments. In some examples, the fragment index assigner 404 encodes fragment indices into identifiers (e.g., fragment names) of the fragments. In some examples, the fragment index assigner 404 encodes fragment indices into metadata associated with fragments. The example fragmenter 400 distributes the code word fragments and the corresponding fragment indices to example storage nodes 304, 306, 308, 310, 312, 314, 316, 318 (FIGS. 3A-3B) (block 512). Thereafter, the example machine-readable instructions 500 cease execution. While the example machine-readable instructions 500 are illustrated as a serial process, one or more blocks may be processed in parallel without departing from the scope of the present disclosure.

FIG. 6 is an example flow diagram representative of example machine-readable instructions 600 that may be executed to implement the example fragment compiler 408 to retrieve objects from the example distributed storage system 300. The example machine-readable instructions 600 of FIG. 6 begin at block 602. At block 602, the example fragment compiler 408 requests a code word fragment of the example object from a storage node according to the node index stored in the example index database 406. The example fragment compiler 408 determines whether the fragment index associated with the code word fragment in the storage node matches the node index (block 604). If the fragment index is the same as the node index (block 604: YES), then control proceeds to block 606.

At block 606, the example fragment compiler 408 receives acknowledgment from the storage node that the code word fragment in the example node has a fragment index matching the node index. The example fragment compiler 408 retrieves the example code word fragment from the example node (block 608). The example fragment compiler 408 begins to compile (e.g., concatenate) the example object using the retrieved example code word fragment according to the example node index and/or the fragment index (e.g., the code word fragment from the first node is the first code word fragment of the code word, the code word fragment from the second node is the second code word fragment of the code word, etc.) (block 610). The example fragment compiler 408 determines whether there are additional nodes with code word fragments (block 612). If there are additional nodes with code word fragments (block 612: YES), then control returns to block 602. If there are no additional nodes with fragments (block 612: NO), the example machine-readable instructions 600 cease execution. In some examples, the example fragment complier 408 queries the example nodes for example code word fragment indices without retrieving the example code word fragments.

However, if the fragment index is not the same as the node index (block 604: NO), then control proceeds to block 614. At block 614, the storage node responds to the example fragment compiler 408 with the fragment index associated with the code word fragment within the storage node. For example, the example fragment compiler 408 requests a first code word fragment (e.g., fragment 0-fragment "A") from the storage node 0 304 (FIG. 3C). In such examples, the storage node 0 304 responds to the example fragment compiler 408 with the fragment index of the code word fragment stored in the storage node 0 304 (e.g., the storage node 0 304 responds that fragment 2 (fragment "C") is stored within the storage node 0 304, not fragment 0 (fragment "A")). At block 616, the example fragment compiler 408 notes the fragment index associated with the example code word fragment (e.g., 2) and retrieves the code word fragment from the storage node. At block 618, the example fragment compiler 408 begins to compile (e.g., concatenate, decode, etc.) the object using the retrieved code word fragment according to the fragment index (e.g., the code word fragment from the first node is the third code word fragment of the code word, the code word fragment from the second node is the second code word fragment of the code word, the code word fragment from the third node is the first code word fragment of the code word, etc.). Thus, the example fragment compiler 408 compiles the code word correctly when the topology of the storage nodes and/or the data within the storage nodes have been rearranged as shown in connection to the example distributed storage system 300 in FIGS. 3A-3C. Thereafter, control the proceeds to block 612. As described above, if there are additional nodes with fragments (block 612: YES), then control returns to block 602. If there are no additional nodes with fragments (block 612: NO), the example machine-readable instructions 600 cease execution. As described here, once an example code word has been recreated, the example fragment compiler 408 can determine the object from which the code word was created (e.g., the code word is the object encoded with error correction coding) and send the object to the requesting application. While the example machine-readable instructions 600 are illustrated as a serial process, one or more blocks may be processed in parallel without departing from the scope of the present disclosure.

FIG. 7 is an example flow diagram representative of example machine-readable instructions 700 that may be executed to implement the example node manager 410 of FIG. 4. In some examples, the machine-readable instructions 700 may be executed prior to the machine-readable instructions 600 to relocate code word fragments into nodes in which the code word fragments were originally stored. The example machine-readable instructions 700 of FIG. 7 begin at block 702. At block 702, the example node manager 410 determines whether the fragment index associated with a first code word fragment in a first node matches the node index, similarly to the example fragment compiler 408 described in connection with FIG. 6 (block 702). If the fragment index associated with the first code word fragment in the first node is the same as the node index (block 702: YES), then the example node manager 410 need not relocate the example code word fragment and control proceeds to block 704.

If the example fragment index associated with the first code word fragment in the first node is not the same as the example node index (block 702: NO), then control proceeds to block 706. At block 706, the example node manager 410 identifies the first code word fragment located at the first node based on the fragment index (e.g., storage node 0 stores fragment 2). In the illustrated example, the node manager 410 identifies a next node corresponding to the fragment index of the first code word fragment (e.g., if the first fragment is fragment 2, then the next node is storage node 2) (block 708). In the illustrated example of FIG. 7, the node manager 410 moves (e.g., copy/cut and paste) the first code word fragment from the first node to the next node (block 710) and control proceeds to block 712. At block 712, the example node manager 410 identifies whether there is another fragment in the first node. If the example node manager 410 identifies that there are no additional fragments within the first node (block 712: NO), control proceeds to block 704. If the example node manager 410 identifies there is another fragment within the first node (block 712: YES), control proceeds to block 714. At block 714, the example node manager 410 treats the other fragment within the first node as the first fragment and control returns to block 708.

At block 704, the example node manager 410 determines whether there are additional nodes with code word fragments. If there are additional nodes with code word fragments (block 704: YES), then control proceeds to block 716. At block 716, the example node manager 410 increments a node counter (e.g., first node=first node+1) such that a subsequent node is processed as discussed in connection with the first node disclosed above. Thereafter, control returns to block 702. If there are no additional nodes with code word fragments (block 704: NO), the example machine-readable instructions 700 cease execution.

The example machine-readable instructions 700 of FIG. 7 relocate code word fragments that have been redistributed (e.g., due to a network outage, server failure, etc.) from the example nodes in which the code word fragments were originally stored using the fragment indices generated and assigned to the example code word fragments by the example fragment index assigner 404 of the example object manager 302 (FIG. 4). In some examples, the machine-readable instructions 700 may be implemented by a background daemon of the example distributed storage system 300 (FIGS. 3A-3C) instead of or in connection with the example node manager 410. In some examples, the fragment compiler 408 compiles (e.g., concatenates, decodes, etc.) the code word fragments according to the example node index (e.g., the order in which the fragments of the object were originally stored). In some examples, the fragment compiler 408 decodes the fragments independent of the order of fragments. While the example machine-readable instructions 700 are illustrated as a serial process, one or more blocks may be processed in parallel without departing from the scope of the present disclosure.

Figure 8:
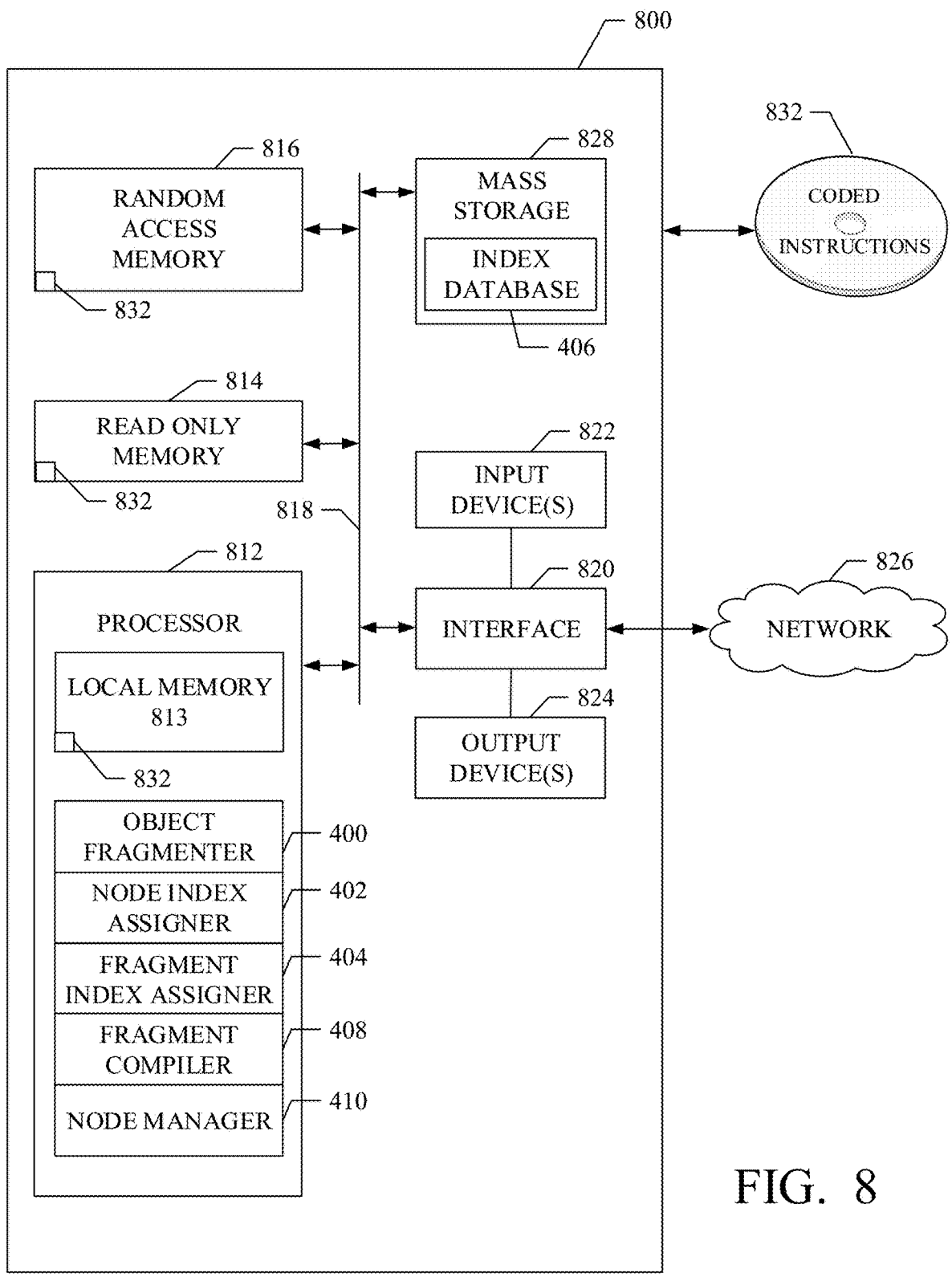
FIG. 8 illustrates an example processor platform structured to execute the example machine-readable instructions of FIGS. 5-7 to implement the example object manager of FIG. 4.

FIG. 8 is a block diagram of an example processor platform 800 capable of executing the instructions of FIGS. 5-7 to implement the example object manager 302 of FIG. 4. The processor platform 800 can be, for example, a server, a personal computer, a mobile device (e.g., a cell phone, a smart phone, a tablet such as an iPad™), a personal digital assistant (PDA), or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer. In the illustrated example, the processor 812 is programmed to implement the example object fragmenter 400, the example node index assigner 402, the example fragment index assigner 404, the example fragment compiler 408, and the example node manager 410.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives. In the illustrated example, the one or more mass storage devices include the example index database 406.

The coded instructions 832 of FIGS. 5-7 may be stored in the mass storage device 828, in the volatile memory 814, in the non-volatile memory 816, and/or on a removable tangible computer readable storage medium such as a CD or DVD.

From the foregoing, it will be appreciated that example methods, apparatus and articles of manufacture have been disclosed which provide indexing of fragments in distributed storage systems such that fragments can be tracked despite their relocation. Example methods, apparatus and articles of manufacture disclosed herein provide fragment relocation based on the assigned indices. Such fragment indexing reduces the number of missing fragments in an error correction encoded code word. Example disclosed methods, apparatus and articles of manufacture disclosed herein increase an error correction rate such that an increased number of objects can be recovered when fragments are relocated, lost, or otherwise unavailable, thus making distributed storage systems more efficient and reliable.

The following further examples include subject matter such as, for example, apparatus to index fragments of objects, methods to index fragments of objects, and tangible computer readable medium comprising instructions, that when executed, cause a machine to index fragments of objects.

Example 1 is an apparatus to index fragments of objects, which includes a fragmenter to encode an object with error correction coding to separate the object into fragments. Example 1 also includes a node index assigner to create a first index indicative of storage nodes where the fragments of the object are to be stored. Example 1 further includes a fragment index assigner to encode a second index into identifiers of the fragments of the object. In example 1, the second index is based on the first index and the fragmenter is to store the fragments of the object and the corresponding second index encoded identifiers in the storage nodes based on the first index.

Example 2 includes the subject matter of example 1, and further includes a fragment compiler to send a message to a first one of the storage nodes requesting a first one of the fragments of the object, and receive a response from the first one of the storage nodes, the response indicating that the first one of the fragments of the object is not stored in the first one of the storage nodes and that a second one of the fragments of the object is stored in the first one of the storage nodes.

Example 3 includes the subject matter of example 1 or example 2, and further includes a fragment compiler to retrieve fragments of the object from corresponding ones of the storage nodes based on the first index and the second index.

Example 4 includes the subject matter of any of examples 1-3, wherein the fragment compiler is to request a first one of the fragments of the object from a first one of the storage nodes. In example 4, when the first index matches the second index for the first one of the storage nodes, the fragment compiler is to retrieve, from the first one of the storage nodes, the first one of the fragments of the object. In example 4, when the first index does not match the second index for the first one of the storage nodes, the fragment compiler is to retrieve, from the first one of the storage nodes, a second one of the fragments of the object associated with the second index.

Example 5 includes the subject matter of any of examples 1-4, wherein the fragment compiler is to reconstruct the object from the fragments based on the first index.

Example 6 includes the subject matter of any of examples 1-4, wherein the fragment compiler is to reconstruct the object from the fragments based on the second index.

Example 7 includes the subject matter of any of examples 1-6, wherein the storage nodes are first storage nodes, and further includes a node manager to, when the fragments of the object are redistributed into second storage nodes, identify a first one of the second storage nodes storing a first one of the fragments of the object, identify a second one of the first storage nodes corresponding to the second index encoded in an identifier of the first one of the fragments of the object stored in the first one of the second storage nodes, and move the first one of the fragments of the object from the first one of the second storage nodes to the second one of the first storage nodes.

Example 8 includes the subject matter of any of examples 1-7, wherein the fragments of the object are to be redistributed into second storage nodes due to at least one of a network outage or data corruption.

Example 9 is a method to index fragments of objects, which includes encoding, with a processor, an object with error correction coding to separate the object into fragments. Example 9 also includes creating, with the processor, a first index indicative of storage nodes where the fragments of the object are to be stored. Example 9 further includes encoding, with the processor, a second index into identifiers of the fragments of the object, the second index based on the first index. Example 9 additionally includes storing, with the processor, the fragments of the object and the corresponding second index encoded identifiers in the storage nodes based on the first index.

Example 10 includes the subject matter of example 9, and further includes sending, with a processor, a message to a first one of the storage nodes requesting a first one of the fragments of the object, and receiving, with the processor, a response from the first one of the storage nodes, the response indicating that the first one of the fragments of the object is not stored in the first one of the storage nodes and that a second one of the fragments of the object is stored in the first one of the storage nodes.

Example 11 includes the subject matter of example 9 or example 10, and further includes retrieving fragments of the object from corresponding ones of the first nodes based on the first index and the second index.

Example 12 includes the subject matter of any of examples 9-11, wherein the retrieving fragments of the object from the storage nodes based on the first index and the second index includes requesting a first one of the fragments of the object from a first one of the storage nodes. Example 12 also includes, when the first index matches the second index for the first one of the storage nodes, retrieving, from the first one of the storage nodes, the first one of the fragments of the object. Example 12 further includes, when the first index does not match the second index for the first one of the storage nodes, retrieving, from the first one of the storage nodes, a second one of the fragments of the object associated with the second index.

Example 13 includes the subject matter of any of examples 9-12, and further includes reconstructing the object from the fragments based on the first index.

Example 14 includes the subject matter of any of examples 9-12, and further includes reconstructing the object from the fragments based on the second index.

Example 15 includes the subject matter of any of examples 9-14, wherein the storage nodes are first storage nodes, and further includes, when the fragments of the object are redistributed into second storage nodes identifying a first one of the second storage nodes storing a first one of the fragments of the object. Example 15 also includes identifying a second one of the first storage nodes corresponding to the second index encoded in an identifier of the first one of the fragments of the object stored in the first one of the second storage nodes. Example 15 further includes moving the first one of the fragments of the object from the first one of the second storage nodes to the second one of the first storage nodes.

Example 16 includes the subject matter of any of examples 9-15, wherein the fragments of the object are redistributed into second storage nodes due to at least one of a network outage or data corruption.

Example 17 includes the subject matter of any of examples 9-16, wherein the fragments of the object are redistributed into the second storage nodes by distributing an amount of data within each of the second storage nodes proportionate to a capacity of each of the second storage nodes.

Example 18 is at least one tangible computer readable storage medium comprising instructions that, when executed, cause at least one machine to at least encode an object with error correction coding to separate the object into fragments. Example 18 further includes instructions, that when executed, cause at least one machine to at least create a first index indicative of storage nodes where the fragments of the object are to be stored. Example 18 also includes instructions, that when executed, cause at least one machine to at least encode a second index into identifiers of the fragments of the object, the second index based on the first index. Example 18 further includes instructions, that when executed, cause at least one machine to at least store the fragments of the object and the corresponding second index encoded identifiers in the storage nodes based on the first index.

Example 19 includes the subject matter of example 18, and further includes instructions that, when executed, cause the at least one machine to send a message to a first one of the storage nodes requesting a first one of the fragments of the object. Example 19 further includes instructions, that when executed, cause at least one machine to at least receive a response from the first one of the storage nodes, the response indicating that the first one of the fragments of the object is not stored in the first one of the storage nodes and that a second one of the fragments of the object is stored in the first one of the storage nodes.

Example 20 includes the subject matter of example 18 or example 19, wherein the instructions, when executed, cause the at least one machine to retrieve fragments of the object from the storage nodes based on the first index and the second index.

Example 21 includes the subject matter of any of examples 18-20, wherein, to retrieve the fragments of the object from the storage nodes based on the first index and the second index, the instructions that, when executed, cause the at least one machine to request a first one of the fragments of the object from a first one of the storage nodes. In example 21 when the first index matches the second index for the first one of the storage nodes, the instructions, when executed, cause the at least one machine to retrieve, from the first one of the storage nodes, the first one of the fragments of the object. In example 21 when the first index does not match the second index for the first one of the storage nodes, the instructions, when executed, cause the at least one machine to retrieve, from the first one of the storage nodes, a second one of the fragments of the object associated with the second index.

Example 22 includes the subject matter of any of examples 18-21, wherein the instructions, when executed, cause the at least one machine to reconstruct the object from the fragments based on the first index.

Example 23 includes the subject matter of any of examples 18-21, wherein the instructions, when executed, cause the at least one machine to reconstruct the object from the fragments based on the second index.

Example 24 includes the subject matter of any of examples 18-23, wherein the storage nodes are first storage nodes, and further include instructions, when executed, cause the at least one machine to, when the fragments of the object are redistributed into second storage nodes, identify a first one of the second storage nodes storing a first one of the fragments of the object. Example 24 further includes instructions that, when executed, cause the at least one machine to identify a second one of the first storage nodes corresponding to the second index encoded in an identifier of the first one of the fragments of the object stored in the first one of the second storage nodes. Example 24 also includes instructions that, when executed, cause the at least one machine to move the first one of the fragments of the object from the first one of the second storage nodes to the second one of the first storage nodes.

Example 25 includes the subject matter of any of examples 18-24, wherein the fragments of the object are redistributed into second storage nodes due to at least one of a network outage or data corruption.

Example 26 includes the subject matter of any of examples 18-25, wherein the fragments of the object are redistributed into the second storage nodes by distributing an amount of data within each of the second storage nodes proportionate to a capacity of each of the second storage nodes.

Example 27 is an apparatus to index fragments of objects. Example 27 includes means for encoding an object with error correction coding to separate the object into fragments. Example 27 also includes means for creating a first index indicative of storage nodes where the fragments of the object are to be stored. Example 27 further includes means for encoding a second index into identifiers of the fragments of the object, the second index based on the first index. Example 27 includes means for storing the fragments of the object and the corresponding second index encoded identifiers in the storage nodes based on the first index.

Example 28 includes the subject matter of example 27, and further includes means for sending a message to a first one of the storage nodes requesting a first one of the fragments of the object. Example 28 also optionally includes means for receiving a response from the first one of the storage nodes, the response indicating that the first one of the fragments of the object is not stored in the first one of the storage nodes and that a second one of the fragments of the object is stored in the first one of the storage nodes.

Example 29 includes the subject matter of example 27 or example 28, and further includes means for retrieving fragments of the object from corresponding ones of the first nodes based on the first index and the second index.

Example 30 includes the subject matter of any of examples 27-29, wherein the means for retrieving fragments of the object from the storage nodes based on the first index and the second index includes means for requesting a first one of the fragments of the object from a first one of the storage nodes, means for, when the first index matches the second index for the first one of the storage nodes, retrieving, from the first one of the storage nodes, the first one of the fragments of the object, and means for, when the first index does not match the second index for the first one of the storage nodes, retrieving, from the first one of the storage nodes, a second one of the fragments of the object associated with the second index.

Example 31 includes the subject matter of any of examples 27-30, further including means for reconstructing the object from the fragments based on the first index.

Example 32 includes the subject matter of any of examples 27-30, further including means for reconstructing the object from the fragments based on the second index.

Example 33 includes the subject matter of any of examples 27-32, wherein the storage nodes are first storage nodes, and further including, when the fragments of the object are redistributed into second storage nodes, means for identifying a first one of the second storage nodes storing a first one of the fragments of the object. Example 33 further includes means for identifying a second one of the first storage nodes corresponding to the second index encoded in an identifier of the first one of the fragments of the object stored in the first one of the second storage nodes. Example 33 also includes means for moving the first one of the fragments of the object from the first one of the second storage nodes to the second one of the first storage nodes.

Example 34 includes the subject matter of any of examples 27-33, wherein the fragments of the object are redistributed into second storage nodes due to at least one of a network outage or data corruption.

Example 35 includes the subject matter of any of examples 27-34, wherein the fragments of the object are redistributed into the second storage nodes by distributing an amount of data within each of the second storage nodes proportionate to a capacity of each of the second storage nodes.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A fragment compiler to compile fragments of an object, the fragment compiler comprising:
    at least one memory;
    machine readable instructions; and
    processor circuitry to execute the machine readable instructions to at least:
    identify a first one of the fragments of the object located in a first storage node of a plurality of storage nodes, the fragments including (a) a node index of storage identifiers associated with respective ones the storage nodes, and (b) a fragment index of fragment identifiers associated with respective ones of the fragments of the object;
    determine if a first fragment index assigned to the first one of the fragments matches a first node index assigned to the first one of the fragments; and
    compile the first one of the fragments into the object in response to determining whether the first fragment index matches the first node index, the processor circuitry to cause a type of compilation based on the match.

2. The fragment compiler as defined in claim 1, wherein the processor circuitry is to compile the first one of the fragments into the object based on the first fragment index in response to determining that the first fragment index does not match the first node index.

3. The fragment compiler as defined in claim 1, wherein the processor circuitry is to receive a response from the first one of the storage nodes indicating that the first one of the fragments of the object is not stored in the first one of the storage nodes and that a second one of the fragments of the object is stored in the first one of the storage nodes.

4. The fragment compiler as defined in claim 3, wherein the processor circuitry is to retrieve, from the first one of the storage nodes, the second one of the fragments when the first fragment index does not match the first node index, wherein the first fragment is different than the second fragment.

5. The fragment compiler as defined in claim 1, wherein the processor circuitry is to retrieve, from the first one of the storage nodes, the first fragment of the object when the fragment index matches the node index.

6. The fragment compiler as defined in claim 1, wherein respective ones of the fragment identifiers are representative of a sequential order of the fragments of the object.

7. The fragment compiler as defined in claim 1, wherein the processor circuitry is to associate respective ones of the fragment identifiers with the respective ones of the storage identifiers to enable verification of storage locations of the respective ones of the fragments of the object relative to respective storage nodes.

8. At least one non-transitory computer readable medium comprising instructions that, when executed, cause processor circuitry to at:
    identify a first one of fragments of an object located in a first storage node of a plurality of storage nodes, the fragments including (a) a node index of storage identifiers associated with respective ones the storage nodes, and (b) a fragment index of fragment identifiers associated with respective ones of the fragments of the object;
    determine if a first fragment index assigned to the first one of the fragments matches a first node index assigned to the first one of the fragments; and
    compile the first one of the fragments into the object in response to determining whether the first fragment index matches the first node index, the processor circuitry to cause a type of compilation based on the match.

9. The at least one non-transitory computer readable medium of claim 8, wherein the instructions cause the processor circuitry to, wherein the processor circuitry is to compile the first one of the fragments into the object based on the first fragment index in response to determining that the first fragment index does not match the first node index.

10. The at least one non-transitory computer readable medium of claim 8, wherein the instructions cause the processor circuitry to receive a response from the first one of the storage nodes indicating that the first one of the fragments of the object is not stored in the first one of the storage nodes and that a second one of the fragments of the object is stored in the first one of the storage nodes.

11. The at least one non-transitory computer readable medium of claim 10, wherein the instructions cause the processor circuitry to retrieve, from the first one of the storage nodes, the second one of the fragments when the first fragment index does not match the first node index, wherein the first fragment is different than the second fragment.

12. The at least one non-transitory computer readable medium of claim 8, wherein the instructions cause the processor circuitry to retrieve, from the first one of the storage nodes, the first fragment of the object when the fragment index matches the node index.

13. The at least one non-transitory computer readable medium of claim 8, wherein respective ones of the fragment identifiers are representative of a sequential order of the fragments of the object.

14. The at least one non-transitory computer readable medium of claim 8, wherein the instructions cause the processor circuitry to associate respective ones of the fragment identifiers with the respective ones of the storage identifiers to enable verification of storage locations of the respective ones of the fragments of the object relative to respective storage nodes.

15. A method to compile fragments of an object, the method comprising:
    identifying a first one of the fragments of the object located in a first storage node of a plurality of storage nodes, the fragments including (a) a node index of storage identifiers associated with respective ones the storage nodes, and (b) a fragment index of fragment identifiers associated with respective ones of the fragments of the object;

determining if a first fragment index assigned to the first one of the fragments matches a first node index assigned to the first one of the fragments; and compiling the first one of the fragments into the object in response to determining whether the first fragment index matches the first node index, and causing a type of compilation based on the match.

16. The method as defined in claim 15, further including comping the first one of the fragments into the object based on the first fragment index in response to determining that the first fragment index does not match the first node index.

17. The method as defined in claim 15, further including receiving a response from the first one of the storage nodes indicating that the first one of the fragments of the object is not stored in the first one of the storage nodes and that a second one of the fragments of the object is stored in the first one of the storage nodes.

18. The method as defined in claim 17, further including retrieving, from the first one of the storage nodes, the second one of the fragments when the first fragment index does not match the first node index, wherein the first fragment is different than the second fragment.

19. The method as defined in claim 15, further including retrieving, from the first one of the storage nodes, the first fragment of the object when the fragment index matches the node index.

20. The method as defined in claim 15, further including associating respective ones of the fragment identifiers with the respective ones of the storage identifiers to enable verification of storage locations of the respective ones of the fragments of the object relative to respective storage nodes.

* * * * *